United States Patent
Xue et al.

(10) Patent No.: US 11,147,052 B2
(45) Date of Patent: Oct. 12, 2021

(54) METHOD, APPARATUS, AND SYSTEM FOR OBTAINING CONTROL RESOURCE SET

(71) Applicant: Huawei Technologies Co., Ltd., Shenzhen (CN)

(72) Inventors: Lixia Xue, Beijing (CN); Xu Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 56 days.

(21) Appl. No.: 16/690,424

(22) Filed: Nov. 21, 2019

(65) Prior Publication Data

US 2020/0092866 A1    Mar. 19, 2020

Related U.S. Application Data

(63) Continuation of application No. PCT/CN2018/103943, filed on Sep. 4, 2018.

(30) Foreign Application Priority Data

Sep. 15, 2017   (CN) .......................... 201710834225.0

(51) Int. Cl.
*H04W 72/04*  (2009.01)
*H04L 5/00*   (2006.01)

(52) U.S. Cl.
CPC ......... *H04W 72/042* (2013.01); *H04L 5/0053* (2013.01)

(58) Field of Classification Search
CPC ............ H04W 72/042; H04W 72/0446; H04L 5/0053; H04L 5/0091; H04L 5/0005; H04L 5/0058
See application file for complete search history.

(56) References Cited

U.S. PATENT DOCUMENTS

2014/0348110 A1   11/2014 Wang et al.
2015/0063324 A1   3/2015 Lee et al.
(Continued)

FOREIGN PATENT DOCUMENTS

CN   103248450 A   8/2013
CN   103716121 A   4/2014
(Continued)

OTHER PUBLICATIONS

Ericsson, "On Data Transmission in Control Resource Sets", 3GPP Draft; R1-1711482, Jun. 26, 2017, XP051300667, 6 pages.
(Continued)

*Primary Examiner* — Diane L Lo
*Assistant Examiner* — Abusayeed M Haque
(74) *Attorney, Agent, or Firm* — Slater Matsil, LLP

(57) ABSTRACT

This application relates to the wireless communications field, and provides a method for obtaining a control resource set. The method includes: receiving, by a terminal device, at least one piece of indication information from a network device, where the at least one piece of indication information is used to indicate a first time domain resource position, and the first time domain resource position is unavailable for transmitting control information; obtaining, by the terminal device, a second control resource set based on the at least one piece of indication information; and detecting, by the terminal device, the control information on the second control resource set.

19 Claims, 6 Drawing Sheets

(56) References Cited

U.S. PATENT DOCUMENTS

| | | | |
|---|---|---|---|
| 2015/0146666 A1* | 5/2015 | Wu | H04L 5/0053 |
| | | | 370/329 |
| 2015/0257086 A1 | 9/2015 | Iang et al. | |
| 2017/0181135 A1* | 6/2017 | Chen | H04L 5/0092 |
| 2017/0310431 A1* | 10/2017 | Iyer | H04L 1/1819 |
| 2017/0338906 A1* | 11/2017 | Peng | H04L 1/0071 |
| 2019/0208482 A1* | 7/2019 | Tooher | H04L 27/2607 |
| 2019/0306847 A1* | 10/2019 | Seo | H04L 25/022 |
| 2019/0357185 A1* | 11/2019 | Kwak | H04L 5/0094 |
| 2020/0065556 A1* | 2/2020 | Murata | G01N 33/483 |
| 2020/0351896 A1* | 11/2020 | Taherzadeh Boroujeni | |
| | | | H04L 25/0202 |

FOREIGN PATENT DOCUMENTS

| | | |
|---|---|---|
| CN | 105144620 A | 12/2015 |
| CN | 105264988 A | 1/2016 |
| CN | 106686728 A | 5/2017 |
| EP | 3101973 A1 | 12/2016 |

OTHER PUBLICATIONS

Catt, "Flexible reuse of DL control resources for data transmission", 3GPP Draft; R1-1712395, Aug. 20, 2017, XP051315211, 4 pages.

Catt, "NR DL control channel structure", 3GPP TSG RAN WG1 Meeting #88, R1-1702092, Athens, Greece, Feb. 13-17, 2017, 4 pages.

Huawei et al, "On PDCCH-CCE-REG mapping and REG bundle", 3GPP TSG RAN WG1 Meeting #90, R1-1712181, Prague, Czech Republic, Aug. 21-25, 2017, 7 pages.

Ericsson, "On Data Transmission in Control Resource Sets", 3GPP TSG RAN WG1 NR Ad-Hoc#2, R1-1711482, Jun. 27-30, 2017, 6 pages, Qingdao, P.R. China.

\* cited by examiner

METHOD, APPARATUS, AND SYSTEM FOR OBTAINING CONTROL RESOURCE SET

CROSS-REFERENCE TO RELATED APPLICATIONS

This application is a continuation of International Application No. PCT/CN2018/103943, filed on Sep. 4, 2018, which claims priority to Chinese Patent Application No. 201710834225.0, filed on Sep. 15, 2017. The disclosures of the aforementioned applications are hereby incorporated by reference in their entireties.

TECHNICAL FIELD

The present invention relates to the wireless communications field, and in particular, to configuration of a control resource set in a wireless communications system.

BACKGROUND

An existing long term evolution (LTE) system includes two types of control channels: a physical downlink control channel (PDCCH) and an enhanced physical downlink control channel (EPDCCH). In time domain, a time-frequency resource region in which the PDCCH is located is first zero to three orthogonal frequency division multiplexing (OFDM) symbols, and a time-frequency resource region in which the EPDCCH is located is all or some downlink OFDM symbols other than those occupied by the PDCCH in the subframe. In frequency domain, a time-frequency region in which the PDCCH is located occupies entire system bandwidth, and a time-frequency region in which the EPDCCH is located occupies a frequency domain width of at least one physical resource block (PRB) in frequency domain.

In the current system, a size of a time-frequency resource on which the PDCCH is located is indicated by indication information carried on a physical control format indicator channel (PCFICH) channel and system broadcast information carried on a PBCH channel. The indication information carried on the PCFICH channel includes two bits, used only to indicate a quantity of time domain OFDM symbols occupied by the time-frequency resource region in which the PDCCH is located, and the quantity is generally zero to three OFDM symbols. However, a size of the time-frequency resource on which the PDCCH is located in frequency domain is indirectly indicated by the system broadcast information carried on the physical broadcast channel (PBCH). A size of a PDCCH region in frequency domain, predefined in a standard, is equal to a system bandwidth value. Therefore, a size of the region in which the PDCCH is located in frequency domain may be indirectly indicated by using indication information that is carried on the PBCH channel and indicates a system bandwidth value.

A size of a frequency domain resource on which the EPDCCH is located is indicated by higher layer signaling (for example, RRC signaling). The higher layer signaling indicates the subframe in which the EPDCCH is located and a frequency domain position of a PRB occupied by the EPDCCH, where the position of the PRB may be a segment of frequency domain resources consecutively occupied, or may be a plurality of non-consecutive PBR resource blocks discretely occupied in frequency domain. The subframe in which the EPDCCH is located in time domain is of a subframe type predefined in a standard (for example, a subframe of a non-multicast channel or a non-special subframe in some radio frame configurations), but a quantity of OFDM symbols occupied by the EPDCCH in time domain also needs to be adjusted based on the received indication information on the PCFICH channel.

In a next-generation wireless communications system, for example, in a new radio (NR) system, downlink control information carried on a control channel is used to indicate a frequency domain position of a resource block (RB) used by a data channel in a data region, and the data channel is used to carry downlink data.

To improve efficiency of blindly detecting a control channel by a terminal device, a concept of a control resource set (referred to as a COREST hereinafter) is put forward in a process of defining an NR standard. To be specific, in a control region, one or more control resource sets are defined for each terminal device. A network device may transmit, to a terminal device, a control channel on any control resource set corresponding to the terminal device. In addition, the network device further needs to notify the terminal device of other configurations associated with the control resource set, for example, a search space. In a plurality of control resource sets defined in the control region, each control resource set has different configuration information, for example, a different width in frequency domain or a different length in time domain. In addition, there is also a message that may affect a current control resource set, for example, a master information block (MIB) message or slot format information (SFI for short). Consequently, the control resource set or other configurations associated with the control resource set need to be reconfigured. For example, when there are a relatively large quantity of burst uplink services, the network device uses SFI to configure a relatively large quantity of uplink OFDM symbols in a slot and reduce a quantity of downlink OFDM symbols. For another example, the network device changes a position of downlink data based on a type of service in the serving cell, and if a start position of data is advanced, the network device changes a position of a demodulation reference signal. Under this prerequisite, how the network device efficiently notifies the terminal device, in a timely manner, of one or more control resource sets configured or reconfigured for the terminal device or other configurations associated with the control resource set is a technical problem that urgently needs to be resolved.

SUMMARY

Embodiments of the present invention describe a method, a wireless apparatus, and a system for obtaining a control resource set, so that a terminal device can efficiently obtain a control resource set in a timely manner for transmitting control information.

According to a first aspect, an embodiment of the present invention provides a method for obtaining a control resource set, where the method includes: receiving, by a terminal device, at least one piece of indication information from a network device, where the at least one piece of indication information is used to indicate a first time domain resource position, and the first time domain resource position is unavailable for transmitting control information; obtaining, by the terminal device, a second control resource set based on the at least one piece of indication information; and receiving, by the terminal device, the control information on the second control resource set.

According to the method, the network device can indicate, to the terminal device, the first time domain resource position unavailable for transmitting the control information, so that the terminal device can determine the second control resource set based on the indication to detect the control information. In this way, signaling overheads caused by reconfiguration of a control resource set by using higher layer signaling are reduced, and a latency in detecting the control information is reduced.

Optionally, the second control resource set does not include a time domain resource in the first time domain resource position.

Optionally, before the receiving, by a terminal device, at least one piece of indication information from a network device, the method further includes: obtaining, by the terminal device, a configured available control resource set, where the available control resource set includes a first control resource set, the first control resource set is used to transmit the control information, and a part or an entirety of the first control resource set occupies the first time domain resource position.

Optionally, the obtaining, by the terminal device, a second control resource set based on the at least one piece of indication information includes: obtaining, by the terminal device, the second control resource set based on the first time domain resource position and the first control resource set.

Optionally, the at least one piece of indication information is further used to indicate a third control resource set; and the obtaining, by the terminal device, a second control resource set based on the at least one piece of indication information includes at least one of the following: using, by the terminal device, the third control resource set indicated by the at least one piece of indication information, as the second control resource set; when the available control resource set configured for the terminal device includes only the first control resource set, using the third control resource set indicated by the at least one piece of indication information, as the second control resource set; when the available control resource set configured for the terminal device includes only the first control resource set, and the entirety of the first control resource set occupies the first time domain resource position, using the third control resource set indicated by the at least one piece of indication information, as the second control resource set; and when the available control resource set configured for the terminal device includes the first control resource set, and the part of the first control resource set occupies the first time domain resource position, obtaining, by the terminal device, the second control resource set based on the first time domain resource position and the first control resource set.

Optionally, the at least one piece of indication information includes at least one piece of first indication information used to indicate the third control resource set and at least one piece of second indication information used to indicate the first time domain resource position; and the terminal device receives the at least one piece of first indication information before receiving the at least one piece of second indication information, and before the at least one piece of second indication information is received, the third control resource set is a candidate control resource set that is not used to receive the control information; or the terminal device receives the at least one piece of first indication information and the at least one piece of second indication information simultaneously, where the at least one piece of indication information is carried in a same broadcast message, or the at least one piece of first indication information and the at least one piece of second indication information are carried in messages or information of different types.

Optionally, the obtaining, by the terminal device, the second control resource set based on the first time domain resource position and the first control resource set includes: the second control resource set is a part of the first control resource set that does not occupy the first time domain resource position; or a start position of the second control resource set on a time domain resource is advanced by first duration from the first control resource set.

Optionally, the available control resource set further includes a fourth control resource set, the fourth control resource set is used to transmit the control information, and the fourth control resource set does not occupy the first time domain resource position; and the second control resource set is the fourth control resource set.

Optionally, the available control resource set further includes a fourth control resource set, the fourth control resource set is used to transmit the control information, and the fourth control resource set does not occupy the first time domain resource position; and the receiving, by the terminal device, the control information on the second control resource set includes: receiving, by the terminal device, the control information on the second control resource set and the fourth control resource set.

Optionally, the method includes: determining, by the terminal device, a mapping mode of a resource element group bundle (REG Bundle) of the second control resource set, where the mapping mode is frequency-domain-first mapping or time-domain-first mapping.

Optionally, the determining, by the terminal device, a mapping mode of a resource element group bundle (REG Bundle) of the second control resource set includes: if a quantity of symbols of time domain resources in the first control resource set is greater than or equal to a quantity of symbols of time domain resources in the second control resource set, and the quantity of time domain symbols in the second control resource set is not equal to 1, determining, by the terminal device, that the mapping mode of the resource element group bundle (REG Bundle) of the second control resource set is the same as a mapping mode of a resource element group bundle of the first control resource set; or if a quantity of symbols of time domain resources in the second control resource set is equal to 1, determining, by the terminal device, that the mapping mode of the resource element group bundle (REG Bundle) of the second control resource set is frequency-domain-first mapping.

Optionally, the method includes: determining, by the terminal device, a quantity of resource element groups in the resource element group bundle (REG Bundle) of the second control resource set.

Optionally, the determining, by the terminal device, a quantity of resource element groups in the resource element group bundle (REG Bundle) of the second control resource set includes: if a resource size included in the second control resource set is less than a first threshold, or the second control resource set cannot support some or all aggregation levels supported by the first control resource set, determining, by the terminal device, that the quantity of resource element groups in the resource element group bundle (REG Bundle) of the second control resource set is less than a quantity of REGs in the REG bundle of the first control resource set; or determining, by the terminal device, the quantity of resource element groups in the resource element group bundle (REG Bundle) of the second control resource set based on first configuration information, where the first configuration information is received by the terminal device from the network device or determined according to a preset rule.

Optionally, the method includes: determining, by the terminal device, search space configuration information of the second control resource set, where the search space configuration information includes one or more of a quantity of control channel candidates, an aggregation level, and a downlink control information format.

Optionally, the determining, by the terminal device, search space configuration information of the second control resource set includes: determining, by the terminal device, the search space configuration information of the second control resource set based on at least one of the resource size included in the second control resource set and search space configuration information of the first control resource set; or determining, by the terminal device, the search space configuration information of the second control resource set based on second configuration information, where the second configuration information is received by the terminal device from the network device or determined according to a preset rule.

Optionally, the determining, by the terminal device, the search space configuration information of the second control resource set based on at least one of the resource size included in the second control resource set and search space configuration information of the first control resource set includes: if the terminal device determines that the resource size included in the second control resource set is less than a second threshold, determining that the search space configuration information of the second control resource set is the same as the first search space configuration information of the first control resource set, or determining that the search space configuration information of the second control resource set is second search space configuration information, where the second search space configuration information is received by the terminal device from the network device or determined according to a preset rule; or if the terminal device determines that the resource size included in the second control resource set is not less than a second threshold, determining that the search space configuration information of the second control resource set is the same as the first search space configuration information of the first control resource set, or determining that the search space configuration information of the second control resource set is second search space configuration information, where the second search space configuration information is received by the terminal device from the network device or determined according to a preset rule.

Optionally, the at least one piece of indication information is used to indicate at least one of a time domain resource position of a demodulation reference signal and a slot format for transmitting the control information.

The first aspect further provides a method for obtaining a control resource set, relating to processing on a network device side, where the method includes: determining, by a network device, at least one piece of configuration information, where the at least one piece of configuration information includes a first time domain resource position, and the first time domain resource position is unavailable for transmitting control information; transmitting, by the network device, at least one piece of indication information to a terminal device, where the at least one piece of indication information is used to indicate the at least one piece of configuration information; obtaining, by the network device, a second control resource set based on the at least one piece of configuration information; and transmitting, by the network device, the control information on the second control resource set.

Optionally, the second control resource set does not include a time domain resource in the first time domain resource position.

Optionally, before the transmitting, by the network device, at least one piece of indication information to a terminal device, the method further includes: configuring, by the network device, an available control resource set for the terminal device, where the available control resource set includes a first control resource set, the first control resource set is used to transmit the control information, and a part or an entirety of the first control resource set occupies the first time domain resource position.

Optionally, the obtaining, by the network device, a second control resource set based on the at least one piece of configuration information includes: obtaining, by the network device, the second control resource set based on the first time domain resource position and the first control resource set.

Optionally, the at least one piece of configuration information further includes a third control resource set; and the obtaining, by the network device, a second control resource set based on the at least one piece of configuration information includes at least one of the following: using, by the network device, the third control resource set as the second control resource set; when the available control resource set configured by the network device for the terminal device includes only the first control resource set, using, by the network device, the third control resource set as the second control resource set; when the available control resource set configured by the network device for the terminal device includes only the first control resource set, and the entirety of the first control resource set occupies the first time domain resource position, using, by the network device, the third control resource set as the second control resource set; and when the available control resource set configured by the network device for the terminal device includes the first control resource set, and the part of the first control resource set occupies the first time domain resource position, obtaining, by the network device, the second control resource set based on the first time domain resource position and the first control resource set.

Optionally, the at least one piece of indication information includes at least one piece of first indication information used to indicate the third control resource set and at least one piece of second indication information used to indicate the first time domain resource position; and the network device transmits the at least one piece of first indication information before transmitting the at least one piece of second indication information, and before the at least one piece of second indication information is transmitted, the third control resource set is a candidate control resource set that is not used to transmit the control information; or the network device transmits the at least one piece of first indication information and the at least one piece of second indication information simultaneously, where the at least one piece of indication information is carried in a same broadcast message, or the at least one piece of first indication information and the at least one piece of second indication information are carried in messages or information of different types.

According to a second aspect, an embodiment of the present invention further provides a wireless apparatus, including a processor and a receiver, where the receiver is configured to receive at least one piece of indication information from a network device, where the at least one piece of indication information is used to indicate a first time domain resource position, and the first time domain resource position is unavailable for transmitting control information;

the processor is configured to obtain a second control resource set based on the at least one piece of indication information; and the receiver is further configured to receive the control information on the second control resource set.

Optionally, the second control resource set does not include a time domain resource in the first time domain resource position.

The second aspect further provides another wireless apparatus, including a processor and a transmitter, where the processor determines at least one piece of configuration information, where the at least one piece of configuration information includes a first time domain resource position, and the first time domain resource position is unavailable for transmitting control information; the transmitter transmits at least one piece of indication information to a terminal device, where the at least one piece of indication information is used to indicate the at least one piece of configuration information; the processor obtains a second control resource set based on the at least one piece of configuration information; and the transmitter transmits the control information on the second control resource set.

According to a third aspect, an embodiment of the present invention provides a communications apparatus, where the communications apparatus is configured to perform any method provided by the first aspect.

According to a fourth aspect, an embodiment of the present invention provides a computer storage medium including an instruction, where when the instruction is run on a computer, the computer is enabled to implement any method provided by the first aspect.

According to a fifth aspect, an embodiment of the present invention provides a communications apparatus, including a processor and a memory, where the memory stores a computer program, and when the processor executes the computer program, any method provided by the first aspect is implemented.

According to a sixth aspect, an embodiment of the present invention provides a computer program product including an instruction, where when the computer program product is run on a computer, the computer is enabled to perform any method provided by the first aspect.

According to a seventh aspect, an embodiment of the present invention provides a chip system, where the chip system includes a processor, configured to support an access network device or a communications apparatus in implementing functions in the foregoing aspect, for example, generating or processing data and/or information in the foregoing method. In a possible design, the chip system further includes a memory, where the memory is configured to store a program instruction and data required by the access network device or the communications apparatus. The chip system may include a chip, or may include a chip and other discrete components.

According to an eighth aspect, an embodiment of the present invention provides a chip, where the chip includes a processing module and a communications interface, the processing module is configured to control the communications interface to communicate externally, and the processing module is further configured to implement any method provided by the first aspect.

In comparison with the current system, in the solutions provided in the embodiments of the present invention, the network device can indicate, to the terminal device, the first time domain resource position unavailable for transmitting the control information, so that the terminal device can determine the second control resource set based on the indication to detect the control information. In this way, signaling overheads caused by reconfiguration of a control resource set by using higher layer signaling are reduced, and a latency in detecting the control information is reduced.

BRIEF DESCRIPTION OF THE DRAWINGS

The following describes embodiments of the present invention in more detail with reference to accompanying drawings.

DETAILED DESCRIPTION OF ILLUSTRATIVE EMBODIMENTS

A network architecture and a service scenario described in the embodiments of the present invention are intended to describe technical solutions in embodiments of the present invention, and do not constitute a limitation on the technical solutions provided in the embodiments of the present invention. A person of ordinary skill in the art may know that, with evolution of the network architecture and emergence of new service scenarios, the technical solutions provided in the embodiments of the present invention are also applicable to similar technical problems.

In the embodiments of the present invention, the word "a" means a single entity, but does not indicate that there is only one entity or that the embodiments cannot be applied to another entity. For example, the term "a terminal device" in the embodiments of the present invention means a terminal device, but does not mean that the embodiments can be applied only to one specific terminal device. The terms "system" and "network" may be used interchangeably in this application. The term "a plurality of" refers to two or more than two. The term "and/or" describes an association relationship between associated objects and indicates that three relationships may exist. For example, A and/or B may represent the following three cases: Only A exists, both A and B exist, and only B exists. The character "/" generally indicates an "or" relationship between associated objects.

Figure 1:
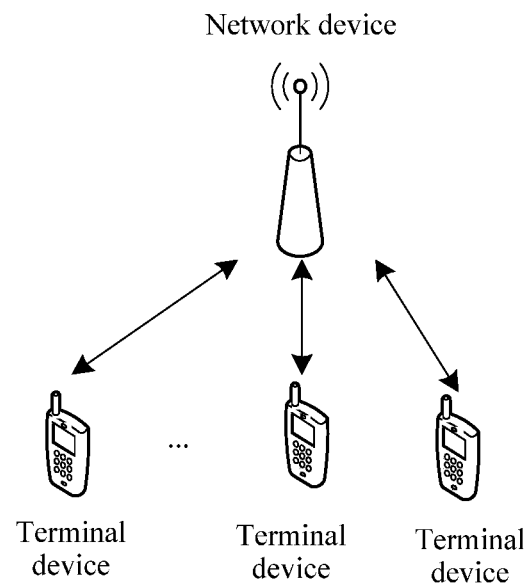
FIG. 1 is a schematic diagram of a possible application scenario according to an embodiment of the present invention.

FIG. 1 is a schematic diagram of a possible application scenario according to an embodiment of the present invention. A communications system in the application scenario includes a network device and one or more terminal devices.

The network device may communicate with a terminal device by using one or more air interface technologies.

The following explains terms that may appear in the embodiments of the present invention.

The communications system may be applicable to an LTE system, or other wireless communications systems using various radio access technologies, for example, systems using access technologies such as code division multiple access, frequency division multiple access, time division multiple access, orthogonal frequency division multiple access, and single carrier frequency division multiple access. In addition, the communications system may be further applicable to a system subsequently evolved from the LTE system, for example, a 5th generation 5G system.

The network device may be a base station, an access point, or an access network device, or may be a device communicating with a wireless terminal over an air interface in an access network by using one or more sectors. The network device may be configured to perform conversion between a received over-the-air frame and an IP packet and serve as a router between the wireless terminal and another part of the access network, where the another part of the access network may include an Internet protocol (IP) network. The network device may further coordinate attribute management of the air interface. For example, the network device may be a base transceiver station (BTS) in global system for mobile communications (GSM) or code division multiple access (CDMA), may be a NodeB (NB) in wideband code division multiple access (WCDMA), or may be an evolved NodeB (eNB or eNodeB) in long term evolution (LTE), or a relay station or an access point, or a base station in a future 5G network, for example, a gNB. This is not limited herein. It should be noted that, in a 5G or NR system, one or more transmission reception points (TRP) may exist within coverage of an NR base station, and all the TRPs belong to a same cell, where each TRP and a terminal may use a measurement reporting method described in the embodiments of this application. In another scenario, the network device may further include a control unit (CU) and a data unit (DU). Within coverage of the CU, a plurality of DUs may exist, where each DU and a terminal may use a measurement reporting method described in the embodiments of this application. A difference between a CU-DU separation scenario and a multi-TRP scenario lies in that, the TRP is only a radio frequency unit or an antenna device, whereas a protocol stack function may be implemented in the DU. For example, a physical layer function may be implemented in the DU.

A terminal device may be a wireless terminal or a wired terminal. The wireless terminal may be a device that provides a user with voice and/or other service data connectivity, may be a handheld device having a wireless connection function, or may be another processing device connected to a wireless modem. The wireless terminal may communicate with one or more core networks through a radio access network (RAN). The wireless terminal may be a mobile terminal, such as a mobile phone (also referred to as a "cellular" phone) and a computer with a mobile terminal, for example, may be a portable, pocket-sized, handheld, computer built-in, or vehicle-mounted mobile apparatus, which exchanges voice and/or data with the radio access network. For example, the terminal device may be a device such as a personal communications service (PCS) phone, a cordless telephone set, a session initiation protocol (SIP) phone, a wireless local loop (WLL) station, or a personal digital assistant (PDA). The wireless terminal may also be referred to as a system, a subscriber unit, a subscriber station, a mobile station, a mobile console (Mobile), a remote station, a remote terminal, an access terminal, a user terminal, a user agent, or a user device (User Device or User Equipment). This is not limited herein.

A symbol includes but is not limited to an orthogonal frequency division multiplexing (OFDM) symbol, a sparse code multiple access (SCMA) symbol, a filtered orthogonal frequency division multiplexing (F-OFDM) symbol, or a non-orthogonal multiple access (NOMA) symbol, which may be specifically determined based on an actual situation. Details are not described herein.

A subframe is a time unit, for example, one millisecond (ms). In addition, one subframe may also occupy K consecutive symbols in time domain, where K is a natural number greater than 0. A value of K may be determined based on an actual situation, and is not limited herein.

A slot (Slot) is a time domain resource unit, and includes J consecutive OFDM symbols in time domain, where J is a natural number greater than 0. A quantity of OFDM symbols included in one slot is related to a cyclic prefix (CP). For example, for a normal CP (Normal cyclic prefix), a quantity of OFDM symbols included in one slot is 14; and for an extended CP (Extended cyclic prefix), a quantity of OFDM symbols included in one slot is 12.

A resource block (RB) is a frequency domain resource unit, and occupies M consecutive subcarriers in frequency domain, where M is a natural number greater than 0. For example, the resource block occupies 12 consecutive subcarriers in frequency domain.

A subcarrier width is a minimum granularity in frequency domain. For example, a value of the subcarrier width includes 15 kHz, 30 kHz, 60 kHz, 120 kHz, 240 kHz, or 480 kHz.

Higher layer signaling is different from physical layer signaling. The higher layer signaling may be one or more of the following: a master information block (MIB) message, system information, and a radio resource control (RRC) message. Further, the system information may be a system information block (SIB) message, or a system information block message for configuring a random access channel (RACH) resource. The RRC message may be a common RRC message, that is, an RRC message transmitted to terminal devices in a cell, or may be a terminal device specific RRC message, that is, an RRC message transmitted to a specific terminal device.

A resource element group bundle (REG Bundle for short) includes a plurality of consecutive REGs in time domain or frequency domain, and the plurality of REGs use same precoding. For example, one REG bundle may include two, three, six, or another quantity of REGs. Therefore, resources of reference signals, included in one REG bundle and used for demodulating a control channel, are more than resources of reference signals included in a single REG. This can improve accuracy of channel estimation, and reduce a bit error rate of control channel transmission.

A search space is a set of PDCCHs (also referred to as PDCCH candidate) to be detected by the terminal device or a set of EPDCCHs (also referred to as EPDCCH candidate) to be detected by the terminal device, so that the terminal device receives control information on the set. One search space includes a plurality of PDCCH candidates or a plurality of EPDCCH candidates. The PDCCH candidates and the EPDCCH candidates are hereinafter collectively referred to as control channel candidates. Aggregation levels of control channel candidates included in one search space are the same. There are two types of search spaces: a common search space (CSS) and a UE specific search space (UESS).

The CSS is a search space that a plurality of terminal devices in a cell need to monitor, and the USS is a search space that specific UE needs to monitor. In addition, the control channel candidates further relate to aggregation levels and downlink control information (DCI for short) formats. Using a PDCCH as an example, the terminal device needs to detect a PDCCH in the search space (search space), to further obtain downlink control information (DCI) carried on the PDCCH. The PDCCH is formed through aggregation of L consecutive downlink control channel elements (control channel element, CCE), where L is referred to as an aggregation level of the PDCCH. The aggregation level may be a positive integer greater than or equal to 1. For the DCI format, the terminal device needs to perform channel decoding based on a bit size corresponding to a specific DCI format; otherwise, the terminal device cannot detect a received signal on the control channel.

Figure 2:
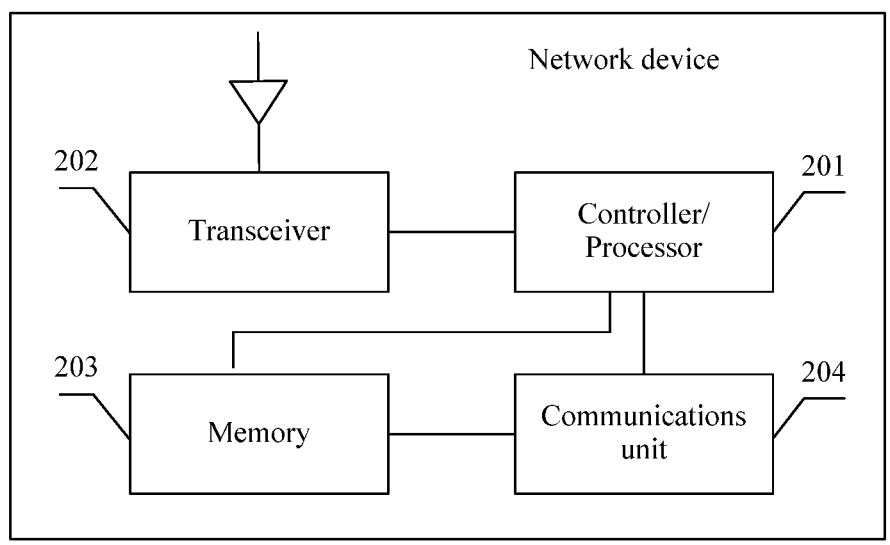
FIG. 2 is a possible schematic structural diagram of a network device according to an embodiment of the present invention.

Further, a possible schematic structural diagram of the network device may be shown in FIG. 2. The network device 102 can perform a method provided by an embodiment of the present invention. The network device 102 may include a controller or processor 201 (the processor 201 is used as an example for description below) and a transceiver 202. The controller/processor 201 is also referred to as a modem processor (modem processor). The modem processor 201 may include a baseband processor (BBP) (not shown). The baseband processor processes a received digital signal to extract information or data bits transmitted in the signal. Therefore, based on a requirement or an expectation, the BBP is generally implemented in one or more digital signal processors (DSP) in the modem processor 201 or implemented in a separate integrated circuit (integrated circuit, IC).

The transceiver 202 may be configured to support information transmission or reception between the network device and the terminal device, and support radio communication between terminal devices. The processor 201 may be further configured to perform functions for communication between various terminal devices and other network devices. In an uplink, an uplink signal from a terminal device is received by an antenna, modulated by the transceiver 202, and further processed by the processor 201 to restore service data and/or signaling information transmitted by the terminal device. In a downlink, service data and/or a signaling message is processed by the terminal device, modulated by the transceiver 202 to generate a downlink signal, and transmitted by the antenna to the terminal device. The network device may further include a memory 203, which may be configured to store program code and/or data of the network device. The transceiver 202 may include an independent receiver circuit and a transmitter circuit, or transmitting and receiving functions may be implemented by a same circuit. The network device may further include a communications unit 204, configured to support the network device in communicating with another network entity, for example, configured to support the network device in communicating with a network device in a core network.

Optionally, the network device may further include a bus. The transceiver 202, the memory 203, and the communications unit 204 may be connected to the processor 201 by using the bus. For example, the bus may be a peripheral component interconnect (Peripheral Component Interconnect, PCI) bus or an extended industry standard architecture (Extended Industry Standard Architecture, EISA) bus. The bus may include an address bus, a data bus, a control bus, or the like.

Figure 3:
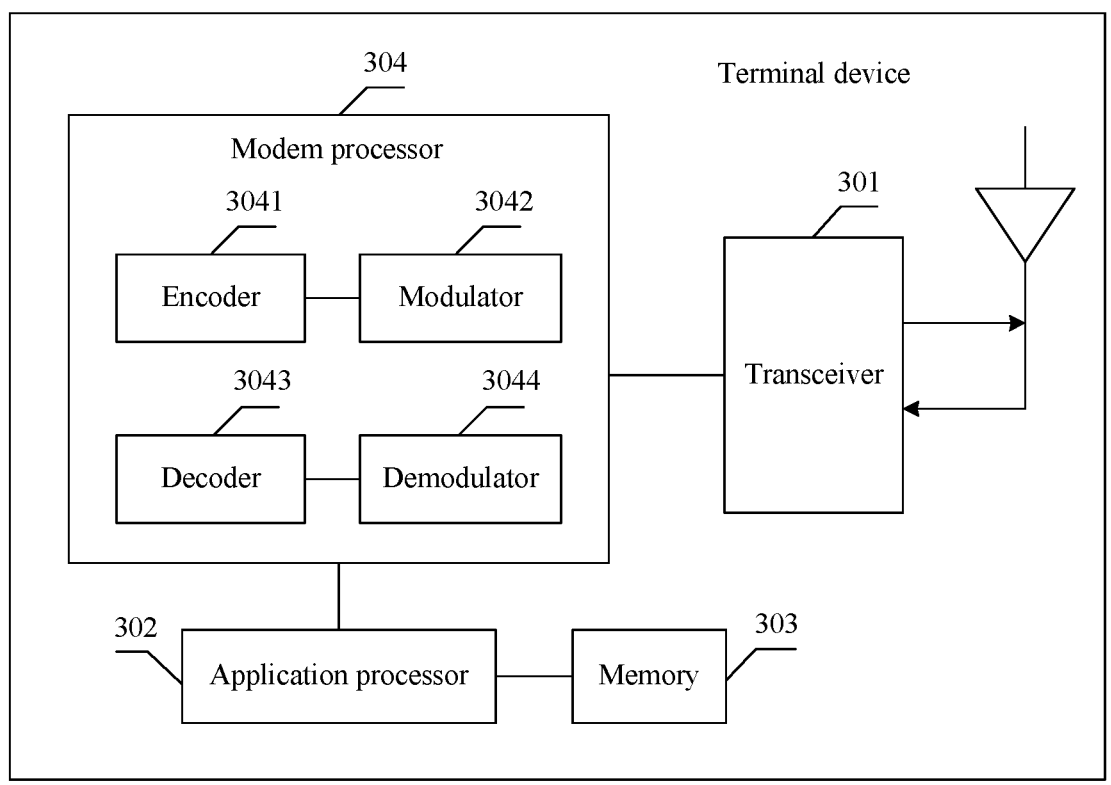
FIG. 3 is a possible schematic structural diagram of a terminal device according to an embodiment of the present invention.

FIG. 3 is a possible schematic structural diagram of a terminal device in the foregoing communications system. The terminal device can perform a method provided by an embodiment of the present invention. The terminal device may be any one of the one or more terminal devices in FIG. 1. The terminal device includes a transceiver 301, an application processor (application processor) 302, a memory 303, and a modem processor (modem processor) 304.

The transceiver 301 may adjust (for example, perform analog conversion, filtering, amplification, and up-conversion on) the output sample and generate an uplink signal, where the uplink signal is transmitted to the base station in the foregoing embodiment by using an antenna. In a downlink, the antenna receives a downlink signal transmitted by the network device. The transceiver 301 may adjust (for example, perform filtering, down-conversion, and digitization on) the signal received from the antenna, and provide an input sample.

The modem processor 304 is also referred to as a controller or processor sometimes, and may include a baseband processor (BBP) (not shown). The baseband processor processes a received digital signal to extract information or data bits transmitted in the signal. Based on a requirement or an expectation, the BBP is generally implemented in one or more digits in the modem processor 304 or implemented in a separate integrated circuit (IC).

In a design, the modem processor 304 may include an encoder 3041, a modulator 3042, a decoder 3043, and a demodulator 3044. The encoder 3041 is configured to encode a to-be-transmitted signal. For example, the encoder 3041 may be configured to receive service data and/or a signaling message to be transmitted in an uplink, and perform processing (for example, format conversion, encoding, or interleaving) on the service data and the signaling message. The modulator 3042 is configured to modulate an output signal of the encoder 3041. For example, the modulator may perform processing such as symbol mapping and/or modulation on the output signal (data and/or signaling) of the encoder, and provide an output sample. The demodulator 3044 is configured to perform demodulation processing on an input signal. For example, the demodulator 3044 processes an input sample and provides symbol estimation. The decoder 3043 is configured to decode the demodulated input signal. For example, the decoder 3043 performs processing such as de-interleaving and/or decoding on the demodulated input signal, and outputs the decoded signal (data and/or signaling). The encoder 3041, the modulator 3042, the demodulator 3044, and the decoder 3043 may be implemented by the composite modem processor 304. The units perform processing based on a radio access technology used by a radio access network.

The modem processor 304 receives, from the application processor 302, digital data that may indicate voice, data, or control information, and processes the digital data for transmission. The modem processor may support one or more of a plurality of wireless communications protocols in a plurality of communications systems, for example, LTE, new radio, a universal mobile telecommunications system (UMTS), or high speed packet access (HSPA). Optionally, the modem processor 304 may also include one or more memories.

Optionally, the modem processor 304 and the application processor 302 may be integrated in a processor chip.

The memory 303 is configured to store program code (sometimes referred to as a program, an instruction, or software) and/or data used for supporting communication of the terminal device.

It should be noted that, the memory 203 or the memory 303 may include one or more storage units, for example, may be a storage unit that is in the processor 201, the modem processor 304, or the application processor 302 and that is used for storing program code, or may be an external storage unit independent of the processor 201, the modem processor 304, or the application processor 302, or may be a component including the storage unit in the processor 201, the modem processor 304, or the application processor 302, and the external storage unit independent of the processor 201, the modem processor 304, or the application processor 302.

The processor 201 and the modem processor 301 may be processors of a same type, or may be processors of different types. For example, the processor may be implemented in a central processing unit (CPU), a general purpose processor, a digital signal processor (DSP), an application-specific integrated circuit (ASIC), a field programmable gate array (FPGA) or another programmable logic device, a transistor logic device, a hardware component, another integrated circuit, or any combination thereof. The processor 201 and the modem processor 301 may implement or perform logical blocks, modules, and circuits described with reference to content disclosed in the embodiments of the present invention. The processor may also be a combination of components implementing a computing function, for example, a combination including one or more microprocessors, a combination of a DSP and a microprocessor, or a system-on-a-chip (system-on-a-chip, SOC).

A person skilled in the art can understand that, various illustrative logical blocks, modules, circuits, and algorithms described in the aspects disclosed in this application may be implemented by electronic hardware, an instruction stored in the memory or another computer-readable medium and executed by the processor or another processing device, or a combination of electronic hardware and an instruction. As an example, the device described in this specification may be used in any circuit, a hardware component, an IC, or an IC chip. The memory disclosed in this application may be a memory of any type and size, and may be configured to store required information of any type. For clearly explaining the interchangeability, various illustrative components, blocks, modules, circuits, and steps are generally described above in a form of functionality. How the functionality is implemented depends on a specific application, design selection, and/or a design constraint imposed on an entire system. A person skilled in the art may implement the described functionality for each specific application in different manners, but the implementation decision shall not be construed as departure from the scope of the present invention.

The following describes configurations of downlink transmission resources by using a 5G communications system as an example. In an NR standard in the 5G communications system, a downlink transmission resource occupies a part or an entirety of system bandwidth in frequency domain, and includes several OFDM symbols in time domain. A control channel may include one or more control channel elements (CCE). One CCE includes a plurality of resource element groups (REG for short). For example, each CCE includes six REGs. Each REG includes 12 consecutive subcarriers in frequency domain, and includes one OFDM symbol in time domain. Therefore, when a network device transmits a control channel, the network device needs to map, in one or more control resource sets allocated to each terminal device, one or more CCEs forming the control channel to a REG in a control channel resource set, where the REG is a physical resource, and the CCE is a logical unit forming the control channel. CCE-to-REG mapping is mapping each CCE used by the control channel to a physical resource.

Currently, in the NR standard, REGs included in a control resource set are numbered in a time-domain-first mode. To be specific, numbering is performed from a position in which a first OFDM symbol included in the control resource set is located and in which a resource block number is the smallest. Optionally, the numbering mode may also be determined based on configuration information of the control resource set. To be specific, numbering is performed in a frequency-first mode or in a time-domain-first mode.

The NR standard supports the following CCE-to-REG resource mapping modes: a non-interleaved resource mapping mode (non-Interleaved), and an interleaved resource mapping mode (Interleaved). When "non-interleaved" is used for CCE-to-REG resource mapping, REGs that belong to a same CCE are consecutive in time domain and/or frequency domain resources. When "interleaved" is used for CCE-to-REG resource mapping, REGs that belong to a same CCE are discretely mapped in time domain and/or frequency domain, and a granularity of discreteness is a size of a REG bundle (REG bundle). The REG bundle includes a plurality of REGs that are consecutive or adjacent in time domain and/or frequency domain, and a size of the REG bundle is related to configurations of the control resource set. For example, when CCE-to-REG mapping in the control resource set is "interleaved", and the control resource set includes one or two OFDM symbols in time domain, the size of the REG bundle may be 2 or 6; or when CCE-to-REG mapping in the control resource set is "interleaved", and the control resource set includes three OFDM symbols in time domain, the size of the REG bundle may be 3 or 6. When CCE-to-REG mapping in the control resource set is "non-interleaved", the size of the REG bundle may be 6.

Given the size of the REG bundle, the REG bundle may include REGs in the time-domain-first mode or the frequency-domain-first mode. For example, when the size of the REG bundle is 2, if the time-domain-first mode is used, REGs forming the REG bundle include two REGs that are consecutive in time domain; or if the frequency-domain-first mode is used, REGs forming the REG bundle include two REGs that are consecutive in frequency domain. Optionally, whether the REG bundle is formed in the time-domain-first mode or the frequency-domain-first mode may be determined based on the configurations of the control channel resource set, or determined based on a quantity of OFDM symbols of the control resource set in time domain. For example, when the control resource set includes two or three OFDM symbols, the REG bundle is formed in the time-domain-first mode; or when the control resource set includes one OFDM symbol, the REG bundle is formed in the frequency-first mode.

In the non-interleaved mode, numbers of logical REG bundles included in one CCE are the same as numbers of physical REG bundles included in the control resource set. In the interleaved mode, numbers of logical REG bundles included in one CCE correspond to a number of at least one physical REG bundle different from the logical numbers. For example, in the non-interleaved mode, numbers of physical REG bundles corresponding to a $j^{th}$ CCE are $\{6\ j/L,\ 6\ j/L+1,\ \ldots,\ 6\ j/L+L-1\}$, where L is a quantity of REGs included in a REG bundle. Numbers of REGs corresponding to a number of an $i^{th}$ REG bundle are $\{i,\ iL+1i,\ \ldots,\ iL+L-1\}$, where a value of L may be $\{2,\ 3,\ 6\}$. In addition, in the interleaved mode, numbers of physical REG bundles corresponding to a $j^{th}$ CCE are $\{f(6j/L), f(6j/L+1),\ \ldots,\ f(6j/L+L-1)\}$, where $f(\cdot)$ may indicate an interleaver.

Figure 4:
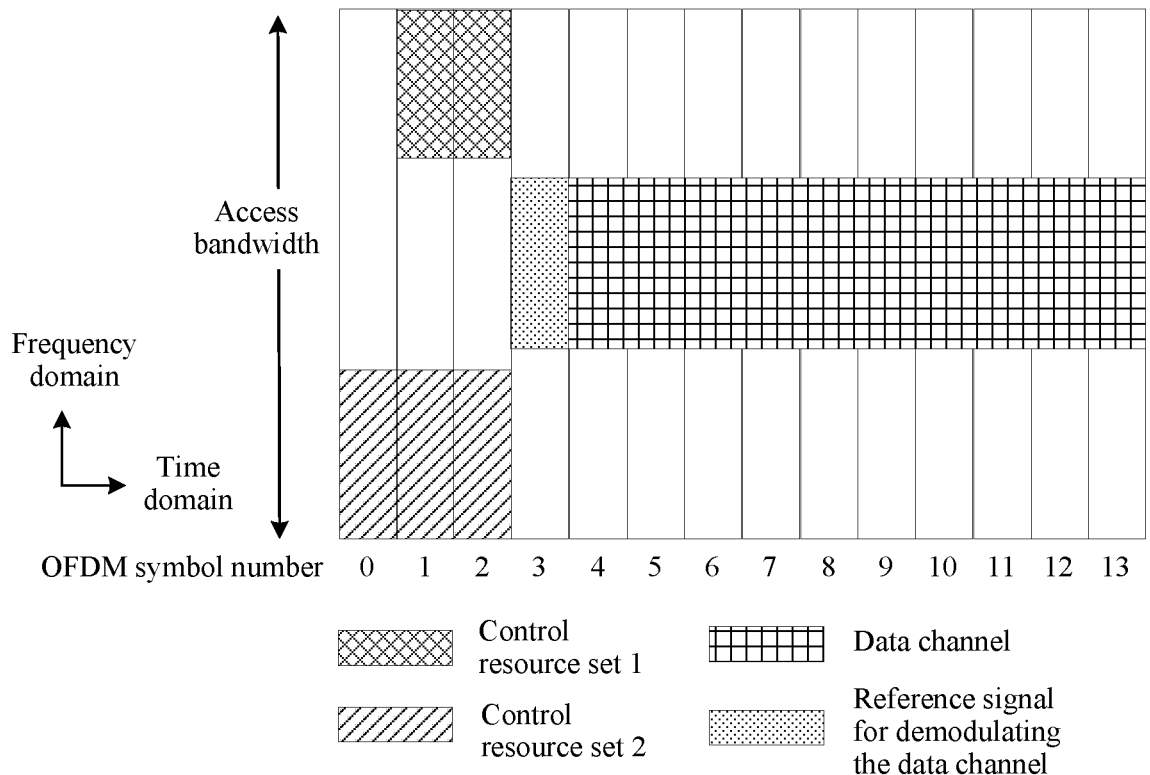
FIG. 4 is a schematic diagram of possible resource positions of control resource sets on a downlink transmission resource and a data channel according to an embodiment of the present invention.

FIG. 4 is a schematic diagram of possible resource positions of control resource sets on a downlink transmission resource and a data channel according to an embodiment of the present invention. The downlink transmission resource occupies a part or an entirety of downlink system bandwidth in frequency domain, and is on the first, the second, and the third OFDM symbols in a slot. A network device configures a control resource set 1 (Control resource set 1) and a control resource set 2 (Control resource set 2) for one or more terminal devices served by the network device. The control resource set 1 and the control resource set 2 overlap on time domain resources, and are independent of each other on frequency domain resources. The network device may schedule data transmission by using a slot as a unit. Specifically, when a slot is used as a unit for data scheduling, the terminal device detects a control channel in the control channel resource set at an interval of a fixed period, where a time unit of the period is one slot. The period may be configured by using configuration information used for configuring the control channel resource set.

The network device configures the control resource set by using higher layer signaling, where the higher layer signaling includes broadcast information, system information (for example, including system information used for configuring an initial access channel (Random access channel during initial access), RRC signaling, or the like. The terminal device obtains the control resource set based on the configuration of the higher layer signaling. That the network device configures the control resource set by using higher layer signaling includes configuring at least one of the following: a frequency domain resource position of the control resource set; a start OFDM symbol of the control resource set in time domain; a length occupied by the control resource set in time domain, that is, a quantity of consecutive OFDM symbols included in the control resource set in time domain; a size of a REG bundle (REG bundle) of the control resource set; a transmission type (transmission type) of the control resource set, where the transmission type includes whether an interleaved mode or a non-interleaved mode is used during CCE-to-REG resource mapping; and a resource mapping mode used by the control resource set, where the resource mapping mode includes a frequency-domain-first resource mapping (Frequency-First, F-F for short) mode or a time-domain-first resource mapping (Time-First, T-F for short) mode.

The frequency domain resource position of the control resource set may be indicated by frequency domain bandwidth, a quantity of REGs in frequency domain, a quantity of REs in frequency domain, or the like. The start OFDM symbol in time domain may be indicated by using an index or a number of an OFDM symbol in a slot or by using one or more bit values to indicate a time domain position in a slot. The length occupied in time domain may be a quantity of OFDM symbols. The type of the REG bundle may be quantities of REGs included in the REG bundle in time domain and frequency domain respectively. For example, [2*3] indicates that the REG bundle includes two consecutive REGs in time domain, and includes three consecutive REGs in frequency domain. All REGs in the REG bundle use a same precoding mode.

The transmission type is a mode in which a CCE carrying control information is mapped to a physical resource at the granularity of a REG bundle, where the transmission mode includes an interleaved mode and a non-interleaved mode. In the non-interleaved mode, numbers of logical REG bundles included in one CCE are the same as numbers of physical REG bundles included in the control resource set. In the interleaved mode, numbers of logical REG bundles included in one CCE correspond to a number of one physical REG bundle different from the logical numbers. For example, in the non-interleaved mode, numbers of physical REG bundles corresponding to a $j^{th}$ CCE are $\{6j/L, 6j/L+1, \ldots, 6j/L+L-1\}$, where L is a quantity of REGs included in a REG bundle. Numbers of REGs corresponding to a number of an $i^{th}$ REG bundle are $\{i, iL+1, \ldots, iL+L-1\}$, where a value of L may be $\{2, 3, 6\}$. In addition, in the interleaved mode, numbers of physical REG bundles corresponding to a $j^{th}$ CCE are $\{f(6j/L), f(6j/L+1), \ldots, f(6j/L+L-1)\}$, where $f(\cdot)$ may indicate an interleaver.

Whether the control resource set uses the F-F resource mapping mode or the T-F resource mapping mode may be indicated by using any indication such as using a bit value, an index, or a number that represents a corresponding mapping mode and can enable the terminal device to determine the resource mapping mode of the control resource set, or by default, the resource mapping mode of the control resource set is one of the F-F resource mapping mode or the T-F resource mapping mode. The default resource mapping mode may be specified in a standard or a protocol, or may be negotiated in advance between the network device and the terminal device, or is notified to or configured for the terminal device by the network device in advance. Specifically, when CCE-to-REG resource mapping is performed in the T-F resource mapping mode, REGs that belong to a same CCE are mapped to the downlink transmission resource in a sequence of first mapping in frequency domain and then mapping in time domain. When CCE-to-REG resource mapping is performed in the T-F resource mapping mode, REGs that belong to a same CCE are mapped to the downlink transmission resource in a sequence of first mapping in time domain and then mapping in frequency domain.

Figure 5:
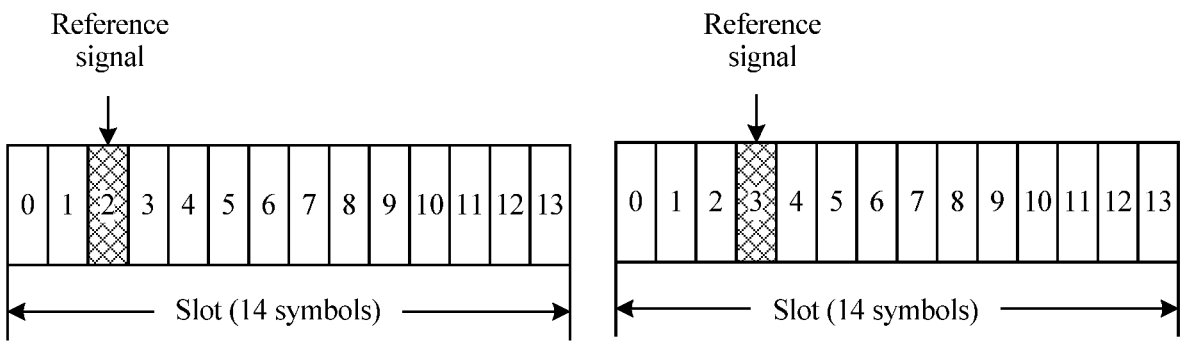
FIG. 5 is a schematic diagram of a possible position of a demodulation reference signal according to an embodiment of the present invention.

FIG. 5 is a schematic diagram of a possible position of a demodulation reference signal according to an embodiment of the present invention. An NR standard further specifies a time domain symbol position of a demodulation reference signal (for example, a DMRS). The demodulation reference signal may be located on the third symbol (a symbol numbered 2) or the fourth symbol (a symbol numbered 3) in each slot. When the demodulation reference signal is located on the third symbol, a control resource set of a terminal device occupies a maximum of two symbols (the first symbol and/or the second symbol) in time domain; or when the demodulation reference signal is located on the fourth symbol, a control resource set of a terminal device occupies a maximum of three symbols (the first symbol, the second symbol, and/or the third symbol) in time domain. Before the position of the demodulation reference signal changes, a network device has configured a control resource set for detecting a control channel for one or more terminal devices served by the network device, but the control resource set may be affected, and further, the network device cannot transmit control information on the configured one or more control resource sets. Consequently, the terminal device cannot receive valid control information on a corresponding control resource set. In this case, the network device needs to reconfigure, by using higher layer signaling, the one or more control resource sets corresponding to the one or more terminal devices. A latency is generated during access of the terminal device, and reconfiguration by using the higher layer signaling also causes additional signaling overheads. Therefore, how to efficiently obtain the one or more control resource sets corresponding to the terminal device on a basis of minimum signaling overheads is a technical problem that urgently needs to be resolved.

The following further describes Embodiment 1 and Embodiment 2 of the present invention in detail based on the foregoing common aspect. In the descriptions about the embodiments, uplink and downlink latencies that may exist are ignored, and it is assumed that a time of transmission by the network device is the same as a time of reception by the terminal device. Processing corresponding to transmission by the network device and reception by the terminal device is mainly described from a perspective of the terminal device side in the embodiments. A person skilled in the art may understand that, reception from the network device by the terminal device means that the network device has performed transmission. It should be noted that, a quantity of sets represented by wordings "first control resource set", "second control resource set", "third control resource set", "fourth control resource set", "fifth control resource set", and "sixth control resource set" in Embodiment 1 and Embodiment 2 of the present invention may be greater than or equal to 1. The quantity of each set may be any quantity, depending on another scenario that may affect configurations of the control resource set, for example, an actual situation, a standard or protocol specification, and/or configuration by the network device. The wording "resource size" is also used in embodiments of the present invention. A person skilled in the art may understand that, the resource size may be indicated by a quantity of resource element groups, a quantity of resource elements, a quantity of control channel elements, a quantity of physical resource blocks, or the like, provided that comparison of resource sizes can be provided. This is not specifically limited in the embodiments of the present invention.

In addition, numbers of steps in Embodiment 1 of the present invention do not limit a sequence in a specific execution process. In different optional designs, a sequence of performing the steps is adjusted appropriately.

Embodiment 1

Embodiment 1 of the present invention provides a method for obtaining a control resource set. In the method, a network device determines at least one piece of configuration information, where the at least one piece of configuration information includes a first time domain resource position, and the first time domain resource position is unavailable for transmitting control information; the network device transmits at least one piece of indication information to a terminal device, where the at least one piece of indication information is used to indicate the at least one piece of configuration information; the network device obtains a second control resource set based on the at least one piece of configuration information; and the network device transmits the control information on the second control resource set. The terminal device receives the at least one piece of indication information from the network device, where the at least one piece of indication information is used to indicate the first time domain resource position, and the first time domain resource position is unavailable for transmitting the control information; the terminal device obtains the second control resource set based on the at least one piece of indication information; and the terminal device receives the control information on the second control resource set. According to the method, the network device can indicate, to the terminal device, the first time domain resource position unavailable for transmitting the control information, so that the terminal device can determine the second control resource set based on the indication to receive the control information. In this way, signaling overheads caused by reconfiguration of a control resource set by using higher layer signaling are reduced, and a latency in detecting the control information is reduced.

Figure 6:
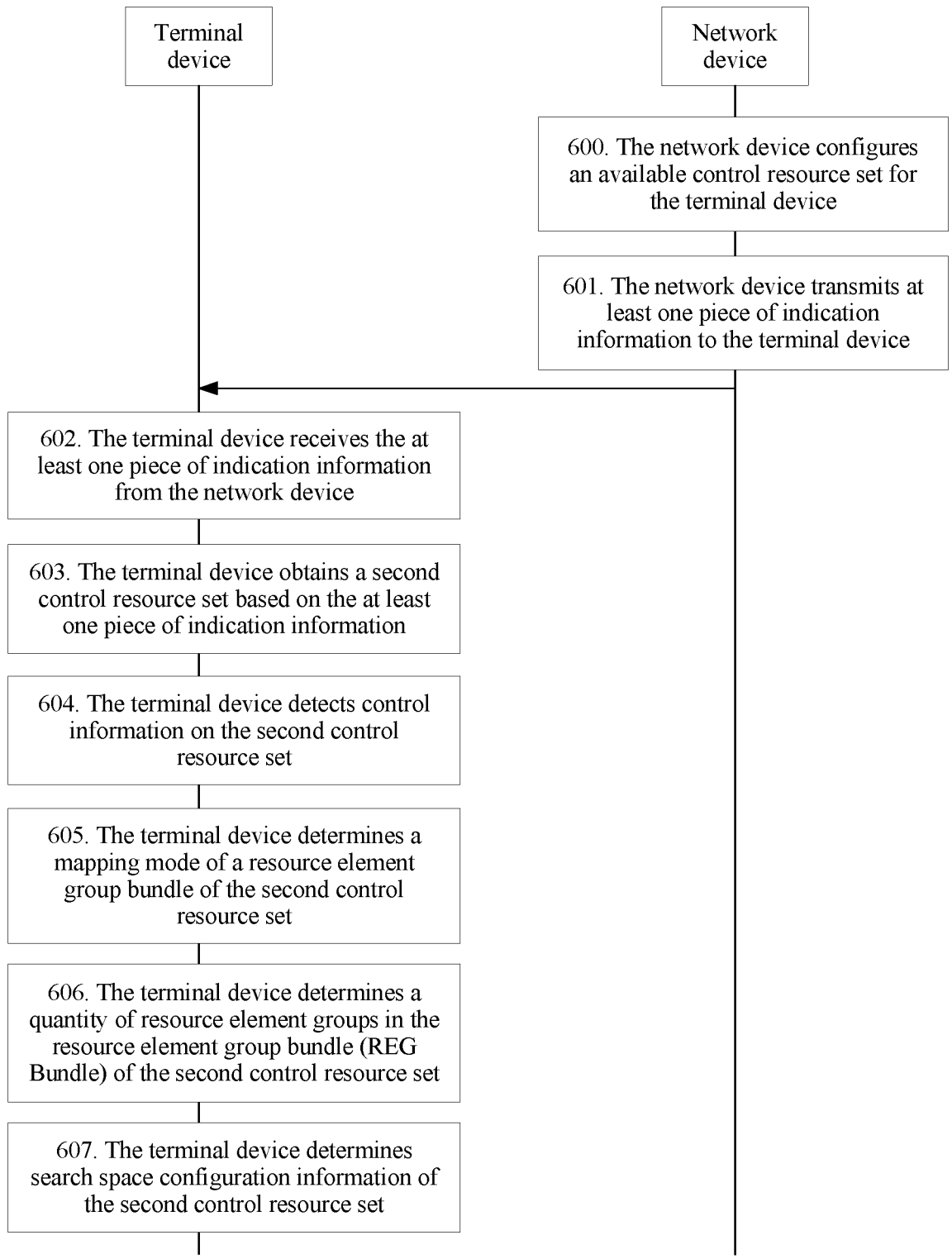
FIG. 6 shows a specific implementation of a method for obtaining a control resource set according to Embodiment 1 of the present invention.

FIG. 6 shows a specific implementation of a method for obtaining a control resource set according to Embodiment 1 of the present invention. Based on FIG. 6, the following describes a solution provided in Embodiment 1 of the present invention.

Step 601: A network device transmits at least one piece of indication information to a terminal device, where the at least one piece of indication information is used to indicate a first time domain resource position, and the first time domain resource position is unavailable for transmitting control information.

In step 601, the network device determines at least one piece of configuration information, where the at least one piece of configuration information includes information of the first time domain resource position, the first time domain resource position is unavailable for transmitting the control information, the at least one piece of indication information is used to indicate the at least one piece of configuration information, and the first time domain resource position may be one or more positions; and further, the network device determines the at least one piece of indication information and a time domain resource position for transmitting the control information.

Step 602: The terminal device receives the at least one piece of indication information from the network device.

Step 603: The terminal device obtains a second control resource set based on the at least one piece of indication information.

Herein it should be noted that, the at least one piece of indication information may be carried in a same message or information or in different messages or information. In addition, the at least one piece of indication information includes at least one piece of first indication information used to indicate a third control resource set and at least one piece of second indication information used to indicate the first time domain resource position. Correspondingly, the at least one piece of configuration information determined by the network device includes the first time domain resource position and the third control resource set. Specifically, the terminal device determines, based on the at least one piece of second indication information, which symbols in a slot can be used by the network device for transmitting the control information, and/or which symbols cannot be used by the network device for transmitting the control information. Details are hereinafter described based on an actual communication scenario and content included in the at least one piece of indication information.

Optionally, that the terminal device obtains a second control resource set may include that the terminal device obtains at least one of a frequency domain resource position of the second control resource set, a start OFDM symbol in time domain, a length occupied in time domain, a type and/or size of a REG bundle of the second control resource set, a transmission type used by the second control resource set, and a resource mapping mode used by the second control resource set.

Step 604: The terminal device receives the control information on the second control resource set.

According to the method for obtaining a control set that is implemented in the foregoing steps 601 to 604, the terminal device can obtain the control resource set based on the indication information from the network device, and the network device can indicate, to the terminal device, the first time domain resource position unavailable for transmitting the control information, so that the terminal device can determine the second control resource set based on the indication to receive the control information. In this way, signaling overheads caused by reconfiguration of a control resource set by using higher layer signaling are reduced, and efficiency of obtaining the control resource set is improved.

Before step 601, the method further includes step 600: The network device configures an available control resource set for the terminal device. The term "available" indicates that the terminal device detects and receives the control information on the control resource set (or a search space of the control resource set). Further, "the network device configures an available control resource set for the terminal device before step 601" may be understood as "the terminal device detects and receives the control information on the available control resource set before step 601 or before receiving the at least one piece of indication information". Further, after step 601 or after receiving the at least one piece of indication information, the terminal device needs to determine the second control resource set, and detect and receive the control information on the second control resource set, or may further detect the control information on another available control resource set that is described later. For details, refer to the following descriptions.

The network device may configure, for the terminal device, at least one of a frequency domain resource position of the available control resource set, a start OFDM symbol in time domain, a length occupied in time domain, a type of a REG bundle (REG bundle) of the available control resource set, a transmission type used by the available control resource set, and a resource mapping technology used by the available control resource set.

Optionally, the available control resource set includes a first control resource set, where the first control resource set is used to transmit the control information, and a part or an entirety of the first control resource set occupies the first time domain resource position in step 101.

That a part of the first control resource set occupies the first time domain resource position indicates that a part of time domain resource positions in the first control resource set overlap a part or an entirety of the first time domain resource position. That an entirety of the first control resource set occupies the first time domain resource position indicates that all time domain resource positions in the first control resource set are a subset of the first time domain resource position.

Further optionally, the available control resource set further includes a fourth control resource set, where the fourth control resource set is used to transmit the control information, and the fourth control resource set does not occupy a time domain resource position in the first time domain resource position.

Further optionally, the network device may configure the available control resource set for the terminal device by using higher layer signaling or physical layer signaling.

About step 601:

In an optional design, the at least one piece of indication information may include one or more pieces of second indication information, the one or more pieces of second indication information include or indicate a time domain resource position, and types of information carried in time domain resource positions included or indicated by different second indication information may be different. Specifically, the terminal device may determine the first time domain resource position in step 601 based on one piece of second indication information in the at least one piece of second indication information or a combination of the at least one piece of second indication information.

Optionally, the second indication information may be a piece of indication information used to indicate a time domain resource position of a demodulation reference signal (DMRS) (for ease of description, the indication information is referred to as first-type indication information below). For example, the indication information indicates that a symbol position of the DMRS in a slot may be a third symbol (a symbol numbered 2 if a first symbol in the slot is numbered 0) or a fourth symbol (a symbol numbered 3 if a first symbol in the slot is numbered 0). The first-type indication information may be carried in messages or information of a plurality of types such as a broadcast message or remaining minimum system information RMSI.

In an implementation, the control information is transmitted in a control resource set 1 in a slot, and the control resource set 1 includes a third symbol in the slot; and if the DMRS needs to occupy the third symbol, the network device needs to adjust transmission of the control information, and transmit the control information on a new control resource set 2. In the implementation, the terminal device needs to obtain the new control resource set based on the indication information.

Optionally, the at least one piece of second indication information is a piece of indication information indicating a slot format (for ease of description, the indication information is referred to as second-type indication information below); and by using the indication information, the terminal device may determine a position of a downlink symbol in the slot. In a scenario of periodic or aperiodic control information transmission, each piece of slot format information used for transmitting control information may be different. In some cases, a symbol in which the control information is transmitted may be affected. The indication information may include the slot format information itself, or an index or a number of the slot format information. The second-type indication information may be carried in a piece of downlink information, for example, downlink control information (DCI for short). Specifically, the slot format information is used to indicate a quantity of downlink symbols, a quantity of symbols of an unknown type, and a quantity of uplink symbols in a slot, or is used to indicate ratios of symbol quantities of downlink symbols, symbols of an unknown type, and uplink symbols in a slot.

In an implementation, the network device determines the slot format according to a preconfigured rule, where the preconfigured rule may be specified by a standard or a protocol, or may be determined by the network device based on different transmission scenarios or transmission requirements, and is notified or transmitted to the terminal device in advance.

In another implementation, the network device determines the slot format based on a plurality of types of preset slot format information. For example, the plurality of types of slot format information may be reflected in a form of a table or in another form. This is not specifically limited herein. For the plurality of types of slot format information reflected in the form of a table, refer to the following Table 1. Herein it should be noted that, formats, parameters, and values of the parameters shown in Table 1 are only an optional manner, and do not constitute a limitation on content and a format of an actual table. Optionally, the indication information may include a format index; and when the format index is included in the indication information, the terminal device may determine a possible position of a downlink symbol in a slot based on the format index.

TABLE 1

| Format index | Quantity of downlink symbols | Unknown type | Quantity of uplink symbols |
| --- | --- | --- | --- |
| 0 | 14 | 0 | 0 |
| 1 | 3 | 11 | |
| 2 | 2 | 12 | |
| 3 | 1 | 13 | |
| 4 | 3 | 10 | 1 |
| 5 | 9 | 4 | |
| 6 | 10 | 3 | |
| 7 | 11 | 2 | |
| 8 | 12 | 1 | |
| 9 | 3 | 9 | 2 |
| 10 | 9 | 3 | |
| 11 | 10 | 2 | |
| 12 | 11 | 1 | |
| 13 | 9 | 2 | 3 |
| 14 | 9 | 1 | 4 |
| 15 | 1 | 10 | 3 |
| 16 | | 4 | 9 |
| 17 | | 3 | 10 |
| 18 | | 2 | 11 |
| 19 | | 1 | 12 |
| 20 | 2 | 9 | 3 |
| 21 | | 3 | 9 |
| 22 | | 2 | 10 |
| 23 | | 1 | 11 |
| 24 | 3 | 2 | 9 |
| 25 | | 1 | 10 |
| 26 | 6 | 1 | 7 |
| 27 | 0 | 0 | 14 |

Optionally, the at least one piece of second indication information includes the first-type indication information and the second-type indication information. In this case, the first-type indication information is used to indicate the time domain resource position of the DMRS, that is, used to indicate a time domain resource position that is occupied and cannot be used for transmitting the control information; and the second-type indication information is used to indicate a slot format, that is, used to indicate which symbols in the slot are used for downlink transmission. The first-type indication information and the second-type indication information may be carried in downlink information or downlink messages of a same type or different types. This is not specifically limited herein.

It should be noted that, the second indication information may be indication information of another type that is used to indicate a time domain resource position available or unavailable for transmitting the control information. The first-type indication information and the second-type indication information are examples for description only, and do not limit the type of the second indication information. If there are a plurality of types of second indication information, the terminal device may determine the first time domain resource position in step 601 based on one or more of the plurality pieces of second indication information.

In the optional design, further, the at least one piece of indication information further includes the at least one piece of first indication information used to indicate the third control resource set.

Optionally, the terminal device may determine, in the process of obtaining the second control resource set, whether the third control resource set may be used as the second control resource set, or included in the second control resource set. The following uses an example for description.

Optionally, provided that the at least one piece of indication information includes the at least one piece of first indication information used to indicate the third control resource set and the at least one piece of second indication information used to indicate the first time domain resource position, if the at least one piece of first indication information is transmitted before the at least one piece of second indication information (without considering a latency or another special case that may cause a large error between a time of transmission and a time of reception, the terminal device receives the at least one piece of first indication information before receiving the at least one piece of second indication information). Optionally, before the at least one piece of second indication information is received, the third control resource set is a candidate control resource set not used for receiving the control information. To be specific, the third control resource set is a reserved candidate control resource set preconfigured by the network device for the terminal device. Before a trigger of the at least one piece of first indication information is received, the terminal device does not receive the control information on the third control resource set.

If the at least one piece of first indication information and the at least one piece of second indication information are transmitted simultaneously (the terminal device receives the at least one piece of first indication information and the at least one piece of second indication information simultaneously), the at least one piece of indication information may be carried in a same piece of higher layer signaling, for example, a broadcast message, or the at least one piece of first indication information and the at least one piece of second indication information are respectively carried in messages or information of different types. This is not specifically limited. The type of the message or information may be different when indication content is different.

In another optional design, that the network device determines the at least one piece of indication information and a time domain resource position for transmitting the control information specifically includes: the network device determines, based on the available control resource set configured by the network device for the terminal device in step 100, that the available control resource set includes the first control resource set, where the part or the entirety of the first control resource set occupies the first time domain resource position in step 101.

Optionally, the network device determines, based on the at least one piece of indication information, a time domain resource position that may be used and/or may not be used for transmitting the control information, for example, the time domain resource position occupied by the DMRS, and/or time domain resource positions such as positions and/or the quantity of downlink symbols determined based on the slot format information, and/or a time domain resource position available or unavailable for transmitting the control information due to another reason, and determines the first control resource set.

For example, when the position of the DMRS changes, a symbol position in the part or the entirety of the first control resource set is occupied by the DMRS, and cannot be used for transmitting the control information.

For another example, when the slot format changes, the quantity of downlink symbols changes; as a result, symbol positions in the part or the entirety of the first control resource set may be used for transmitting information of uplink symbols or an unknown type, and cannot be used for transmitting the downlink control information.

Further, if the network device determines that the part or the entirety of the first control resource set occupies the part or the entirety of the first time domain resource position, the network device determines the second control resource set, generates the at least one piece of indication information, and transmits the at least one piece of indication information to the terminal device.

About step 603:

For the manner of obtaining the second control resource set based on the at least one piece of indication information, a plurality of optional designs are provided in Embodiment 1 of the present invention. In the following plurality of optional designs, the second control resource set does not include a time domain resource in the first time domain resource position, to avoid reduction of detection efficiency of the terminal device and unnecessary power consumption caused when the terminal device performs detection on the time domain resource unavailable for transmitting the control information.

Herein it should be noted that, the manner in which the terminal device obtains the second control resource set based on the at least one piece of indication information is the same as the manner in which the network device determines the second control resource set. Therefore, it is ensured that the terminal device and the network device perform respective processing on the same second control resource set. This obtaining manner or determining manner is pre-agreed upon by the network device and the terminal device, or is notified by the network device to the terminal device in advance, or may be specified in a protocol or a standard. This is not specifically limited. The same descriptions are applicable to Embodiment 2 of the present invention. It should be noted that, the following optional designs are examples for description only, and do not limit a specific implementation.

In an optional design, the terminal device obtains the second control resource set based on the first time domain resource position and the first control resource set.

Optionally, the second control resource set is a part of the first control resource set that does not occupy the first time domain resource position.

Specifically, if a part of the first control resource set occupies the first time domain resource position, the second control resource set is a remaining part of the first control resource set that does not occupy the first time domain resource position. To be specific, the second control resource set is a proper subset of the first control resource set. In this implementation, the second control resource set can avoid an unavailable time domain resource position, and signal transmission on other time domain symbols than a time domain resource occupied by the first control resource set in the slot is not affected.

For example, the first control resource set occupies a second symbol and a third symbol in a slot. If the at least one piece of indication information such as the slot format information and/or the demodulation reference signal indicates that the third symbol cannot be used for transmitting the control information, it may be determined that a time domain resource position of the second control resource set is the second symbol in the slot.

Optionally, a start position of the second control resource set on a time domain resource is advanced by first duration from the first control resource set.

In an implementation, the second control resource set and the first control resource set occupy a same frequency domain resource size and a same time domain resource size. This implementation can ensure that the second control resource set and the first control resource set occupy the same time domain resource size and the same frequency domain resource size, and reduce additional signaling overheads and an access latency caused by a change of a time domain resource position of a control resource set.

Specifically, provided that the second control resource set does not include the time domain resource in the first time domain resource position, the second control resource set and the first control resource set occupy the same frequency domain resource size and the same time domain resource size. In this case, an offset of the first duration exists between the start position of the second control resource set and that of the first control resource set on the time domain resource, and a length of the first duration needs to be determined based on the first time domain resource position and a time domain resource position of the first control resource set.

For example, the time domain resource position of the first control resource set is the second symbol and the third symbol in a slot. If the at least one piece of indication information such as the slot format information and/or the demodulation reference signal indicates that the third symbol cannot be used for transmitting the control information, it may be determined that the time domain resource position of the second control resource set is the first symbol and the second symbol in the slot, where the first duration is one symbol, and an offset direction is advance, to ensure that the second control resource set and the first control resource set occupy the same time domain resource size, and further occupy the same frequency domain resource size, without affecting transmission of the control information. In this implementation, if the first symbol has been preconfigured for another purpose or used by another terminal device, a collision resolution mechanism needs to be used to process impact caused by obtaining of the second control resource set on the another purpose or another terminal device. The collision resolution mechanism is not described in detail in Embodiment 1 of the present invention. A similar collision resolution mechanism in the current system, for example, a manner such as setting priorities, or other possibly used collision resolution mechanisms, may be used for processing to maximally ensure that there is no impact on transmission of the control information and reduce the impact on the preconfigured another purpose or another terminal.

For another example, the time domain resource position of the first control resource set is the third symbol in a slot. If the at least one piece of indication information such as the slot format information and/or the demodulation reference signal indicates that the third symbol and the second symbol in the slot cannot be used for transmitting the control information, it may be determined that the time domain resource position of the second control resource set is the first symbol in the slot, where the first duration is two symbols, and an offset direction is advance, to ensure that the second control resource set and the first control resource set occupy the same time domain resource size, and further occupy the same frequency domain resource size, without affecting transmission of the control information. Similarly, the aforementioned collision resolution mechanism may be used to process a collision that may exist. Details are not described again herein.

In another implementation, the time domain resource size of the second control resource is smaller than the time domain resource size of the first control resource set. Because the start position of the second control resource set on the time domain resource is advanced by the first duration from the first control resource set, the time domain resource size available for the second control resource set may be smaller than the time domain resource size of the first control resource set.

For example, the time domain resource position of the first control resource set is the second symbol and the third symbol in a slot. If the at least one piece of indication information such as the slot format information and/or the demodulation reference signal indicates that the third symbol and the first symbol in the slot cannot be used for transmitting the control information, it may be determined that the time domain resource position of the second control resource set is the second symbol in the slot, where the first duration is one symbol, an offset direction is advance, and the time domain resource after the offset is smaller than the time domain resource of the first control resource set.

In the optional design, further optionally, the at least one piece of indication information is further used to indicate the third control resource set. For example, the at least one piece of indication information includes the at least one piece of first indication information used to indicate the third control resource set. Provided that the second control resource set is obtained based on the first time domain resource position and the first control resource set, the terminal device may not use the third control resource set.

For example, the network device indicates the at least one piece of first indication information and the at least one piece of second indication information by using higher layer signaling. If sufficient resources for transmitting the control information may be obtained from the second control resource set based on the second indication information and the first control resource set, the terminal device does not receive the control information on the third control resource set. Using a CSS and a USS as an example, the following provides further descriptions.

The third control resource set includes a common search space, where the common search space (CSS) is used for transmitting common control information of a serving cell. Because all terminal devices in the serving cell can detect a control channel in the common search space, a maximum width of the third control resource set in frequency domain should be configured within a threshold, so that a terminal device having a minimum access bandwidth capability can access a system. In addition, an aggregation level of a control channel candidate included in the common search space is higher, that is, a control channel candidate occupies more resources in the third control resource set, and remaining resources for carrying an additional control channel candidate may be insufficient. Therefore, when the terminal device can obtain at least one available second control resource set, the terminal device does not detect a control channel candidate included in a UE specific search space (USS) in the third control resource set.

In another optional design, the terminal device uses the third control resource set indicated by the at least one piece of first indication information in the at least one piece of indication information, as the second control resource set.

In an implementation, the terminal device directly uses the third control resource set indicated by the at least one piece of indication information, as the second control resource set. In this implementation, if the at least one piece of indication information indicates the third control resource set, the terminal device does not consider a case in which the first time domain resource position indicated by the at least one piece of indication information overlaps the time domain resource position of the first control resource set, but directly obtains the third control resource set as the second control resource set. Therefore, efficiency of obtaining the control resource set is improved, and a latency in detecting the control information is reduced.

In another implementation, when the available control resource set configured for the terminal device includes only the first control resource set, the third control resource set indicated by the at least one piece of indication information is used as the second control resource set.

Specifically, when the available control resource set includes only the part or the entirety of the first control resource set that occupies the first time domain resource position, the terminal device directly obtains the third control resource set as the second control resource set. Therefore, efficiency of obtaining the control resource set is improved, and a latency in detecting the control information is reduced.

In still another implementation, when the available control resource set configured for the terminal device includes only the first control resource set, and the entirety of the first control resource set occupies the first time domain resource position, the third control resource set indicated by the at least one piece of indication information is used as the second control resource set.

Specifically, when the available control resource set includes only the entirety of the first control resource set that occupies the first time domain resource position, the terminal device directly obtains the third control resource set as the second control resource set. Therefore, efficiency of obtaining the control resource set is improved, and a latency in detecting the control information is reduced.

In the optional design, provided that the at least one piece of indication information indicates the third control resource set, only several implementations in which the terminal device uses the third control resource set as the second control resource set are illustrated. This design is a choice provided for improving efficiency of detecting the control information by the terminal device provided that the network device consumes certain signaling to configure the third control resource set for the terminal device.

In still another optional design, provided that the available control resource set includes the fourth control resource set, the second control resource set is the fourth control resource set.

Herein it should be noted that, if the available control resource set further includes the fourth control resource set that does not occupy the first time domain resource position, that the terminal device obtains the second control resource set is: the terminal device obtains the fourth control resource set. Herein the obtaining may be directly obtaining the fourth control resource set by the terminal device to subsequently receive the control information, without additionally performing an operation of using the fourth control resource set as the second control resource set. The two sets are distinguished only for ease of describing the solution, and do not implicitly indicate whether there is an excessive action to be performed.

For step 604:

In an optional design, that the terminal device receives the control information on the second control resource set is: the terminal device receives the control information only on the second control resource set.

In another optional design, the available control resource set further includes the fourth control resource set, the fourth control resource set is used to transmit the control information, and provided that the fourth control resource set does not occupy the first time domain resource position, that the terminal device receives the control information on the second control resource set includes: the terminal device receives the control information on the second control resource set and the fourth control resource set.

In the optional design, if the fourth control resource set that does not partly or completely overlap the first time domain resource position exists in the available control resource set obtained by the terminal device before the terminal device receives the at least one piece of indication information, the network device still transmits the control information on the fourth control resource set. In this case, the terminal device still needs to receive the control information on the fourth control resource set. Therefore, a previous available resource can be used, and resource utilization can be improved.

In Embodiment 1 of the present invention, the method further includes at least one of the following steps:

Step 605: The terminal device determines a mapping mode of a resource element group bundle (REG Bundle) of the second control resource set, where the mapping mode is frequency-domain-first mapping or time-domain-first mapping.

Step 606: The terminal device determines a quantity of resource element groups in the resource element group bundle (REG Bundle) of the second control resource set.

Herein it should be noted that, the terminal device may perform corresponding determining according to a preconfigured rule in step 605 and/or step 606, or perform determining based on the configuration information delivered by the network device. If processing is performed according to the preconfigured rule, the preconfigured rule may be specified in a standard or a protocol, or may be determined by the network device based on different transmission scenarios or transmission requirements, and is already notified or transmitted to the terminal device in advance. The terminal device can determine the mapping mode of the REG bundle in step 605 and/or the quantity of REGs in the REG bundle in step 106 based on the second control resource set.

For step 605:

In an optional design, if a quantity of symbols of time domain resources in the first control resource set is greater than or equal to a quantity of symbols of time domain resources in the second control resource set, and the quantity of time domain symbols in the second control resource set is not equal to 1, the terminal device determines: optionally, the mapping mode of the resource element group bundle (REG Bundle) of the second control resource set is the same as a mapping mode of a resource element group bundle of the first control resource set. In this mode, when the quantity of time domain symbols in the second control resource set is greater than 1, use of the same mapping mode of the REG bundle for the second control resource set and the first control resource set is maintained as far as possible, to improve detection efficiency of the terminal device.

For example, the first control resource set occupies first three symbols in a slot, and the mapping mode of the REG bundle is the time-domain-first mapping mode. Provided that the first time domain resource position indicates that the third symbol in the first three symbols is unavailable for transmitting the control information, the terminal device determines, based on content in the foregoing description in Embodiment 1 of the present invention, that the second control resource set occupies first two symbols in the slot, and further determines that the mapping mode of the REG bundle of the second control resource set may be still the time-domain-first mapping mode same as that of the first control resource set. Optionally, provided that the terminal device determines that the time domain resource becomes smaller, the terminal device may further determine that the mapping mode of the REG bundle of the second control resource set is the frequency-domain-first mapping mode.

Optionally, the terminal device determines that the mapping mode of the REG bundle of the second control resource set is frequency-domain-first mapping. In this mode, it can be ensured as far as possible that the REG bundle is first mapped in frequency domain, and settings of the REG bundle are optimized if the quantity of time domain symbols in the second control resource set is relatively small, so that the terminal device can receive the control information.

In another optional design, if a quantity of symbols of time domain resources in the second control resource set is equal to 1, the terminal device determines that the mapping mode of the resource element group bundle (REG Bundle) of the second control resource set is frequency-domain-first mapping.

In still another optional design, the terminal device may determine the mapping mode of the REG bundle of the second control resource set based on configuration information that is delivered by the network device and used for configuring the mapping mode of the REG Bundle.

Optionally, the configuration information may be delivered by using higher layer signaling or physical layer signaling, or may be notified or transmitted by the network device to the terminal device in advance before the at least one piece of indication information is transmitted, or may be transmitted to the terminal device when or after the at least one piece of indication information is transmitted. This is not specifically limited herein, and is determined based on the notification or configuration performed in advance by the network device for the design, or a result of negotiation between the network device and the terminal device, or a standard or protocol specification.

For step 606:

In an optional design, if a resource size included in the second control resource set is less than a first threshold, or the second control resource set cannot support some or all aggregation levels supported by the first control resource set, the terminal device determines that the quantity of resource element groups in the resource element group bundle (REG Bundle) of the second control resource set is less than a quantity of REGs in the REG bundle of the first control resource set. In this design, if the resource size of the control resource set becomes smaller, the quantity of REGs in the REG bundle is reduced, and settings of the REG bundle are optimized.

For example, the first control resource set occupies first three symbols in a slot, and the REG bundle includes six REGs. Provided that the first time domain resource position indicates that the third symbol in the first three symbols is unavailable for transmitting the control information, the terminal device determines, based on content in the foregoing description in Embodiment 1 of the present invention, that the second control resource set occupies first two symbols in the slot. If a quantity of resources is less than the first threshold, or an aggregation level 8 supported by the first control resource set cannot be supported, the terminal device determines that a size of the REG bundle of the second control resource set is 3. If the resource size of the second control resource set is greater than the first threshold or the second control resource set can support all or some aggregation levels supported by the first control resource set, the terminal device may determine that the REG bundle of the second control resource set includes six REGs.

In another optional design, the terminal device determines a quantity of resource element groups in the resource element group bundle (REG Bundle) of the second control resource set based on first configuration information.

Herein it should be noted that, the mapping mode of the REG bundle may be determined in step 105 with reference to the manner of determining the quantity of REGs in the REG bundle in step 106; or the quantity of REGs in the REG bundle may be determined in step 106 with reference to the manner of determining the mapping mode of the REG bundle in step 105. The mapping mode of the REG bundle of the second control resource set and the quantity of REGs in the REG bundle are determined based on such comprehensive considerations. This is not specifically limited herein.

Because the control resource set changes, which further causes the mapping mode of the REG bundle and/or the quantity of REGs in the REG bundle to change, search space configurations may be affected. Therefore, the method in Embodiment 1 of the present invention further includes the following step:

Step 607: The terminal device determines search space configuration information of the second control resource set, where the search space configuration information includes one or more of a quantity of control channel candidates, an aggregation level, and a downlink control information format.

In an optional design, that the terminal device determines search space configuration information of the second control resource set includes: in an implementation, the terminal device determines the search space configuration information of the second control resource set based on at least one of the resource size included in the second control resource set and search space configuration information of the first control resource set.

Optionally, if the terminal device determines that the resource size included in the second control resource set is less than a second threshold, the terminal device determines that the search space configuration information of the second control resource set is the same as the first search space configuration information of the first control resource set, or determines that the search space configuration information of the second control resource set is second search space configuration information, where the second search space configuration information is received by the terminal device from the network device or determined according to a preset rule. Herein for explanations about the configuration information and the preset rule, refer to the descriptions about similar wordings above.

Optionally, if the terminal device determines that the resource size included in the second control resource set is not less than a second threshold, the terminal device determines that the search space configuration information of the second control resource set is the same as the first search space configuration information of the first control resource set, or determines that the search space configuration information of the second control resource set is second search space configuration information, where the second search space configuration information is received by the terminal device from the network device or determined according to a preset rule.

For example, when the resource size included in the second control resource set is sufficient relative to an aggregation level in a search space of the first control resource set, an aggregation level in a search space of the second control resource set remains unchanged. For example, when the control resource set changes from 32 CCEs to 16 CCEs, although resources are reduced, a control channel candidate whose aggregation level is 8 may be still supported. In this case, the aggregation level included in the search space remains unchanged. Optionally, after reduction of resources, if the second control resource set cannot support the aggregation level 8 supported by the first control resource set, an item whose quantity is 8 needs to be removed from an aggregation level set in the search space of the second control resource set.

For another example, control channel candidates in the search space of the first control resource set are distributed on first three symbols in a slot. If a quantity of control channel candidates is 16, and four of the 16 control channel candidates are located on the third symbol in the slot, the terminal device determines, based on an indication of the at least one piece of indication information, that the third symbol is unavailable for transmitting the control information. In this case, the terminal device determines that a quantity of control channel candidates of the second control resource set is 12.

For another example, if the resource size included in the second control resource set is sufficient relative to a size of a control information format in the search space of the first control resource set, and a code rate of control information transmitted in the second control resource set is not greater than 1, the control information format in the search space of the first control resource set may be still used.

For another example, sizes of formats of downlink control information DCI used for receiving control channel candidates in the first control resource set are {40 bits, 60 bits, 120 bits}, where 120 bits correspond to control channel candidates whose aggregation levels are 8 and 16. If the control channel candidates whose aggregation levels are 8 and 16 are not included in the control resource set because the resource size of the second control resource set cannot support the aggregation levels 8 and 16, corresponding DCI formats do not need to be detected either. Further, the terminal device determines that the sizes of the DCI formats change from {40 bits, 60 bits, 120 bits} to {40 bits, 60 bits}.

For the configuration information mentioned in steps 606 and 607, herein it should be noted that, the configuration information may be delivered by the network device by using higher layer signaling or physical layer signaling, and is notified or delivered by the network device to the terminal device in advance before the at least one piece of indication information is transmitted, or may be delivered to the terminal device when or after the at least one piece of indication information is transmitted. This is not specifically limited herein, and is determined based on the notification or configuration performed in advance by the network device for the steps, or a result of negotiation between the network device and the terminal device, or a standard or protocol specification.

Embodiment 2

The following further describes Embodiment 2 of the present invention in detail.

Figure 7:
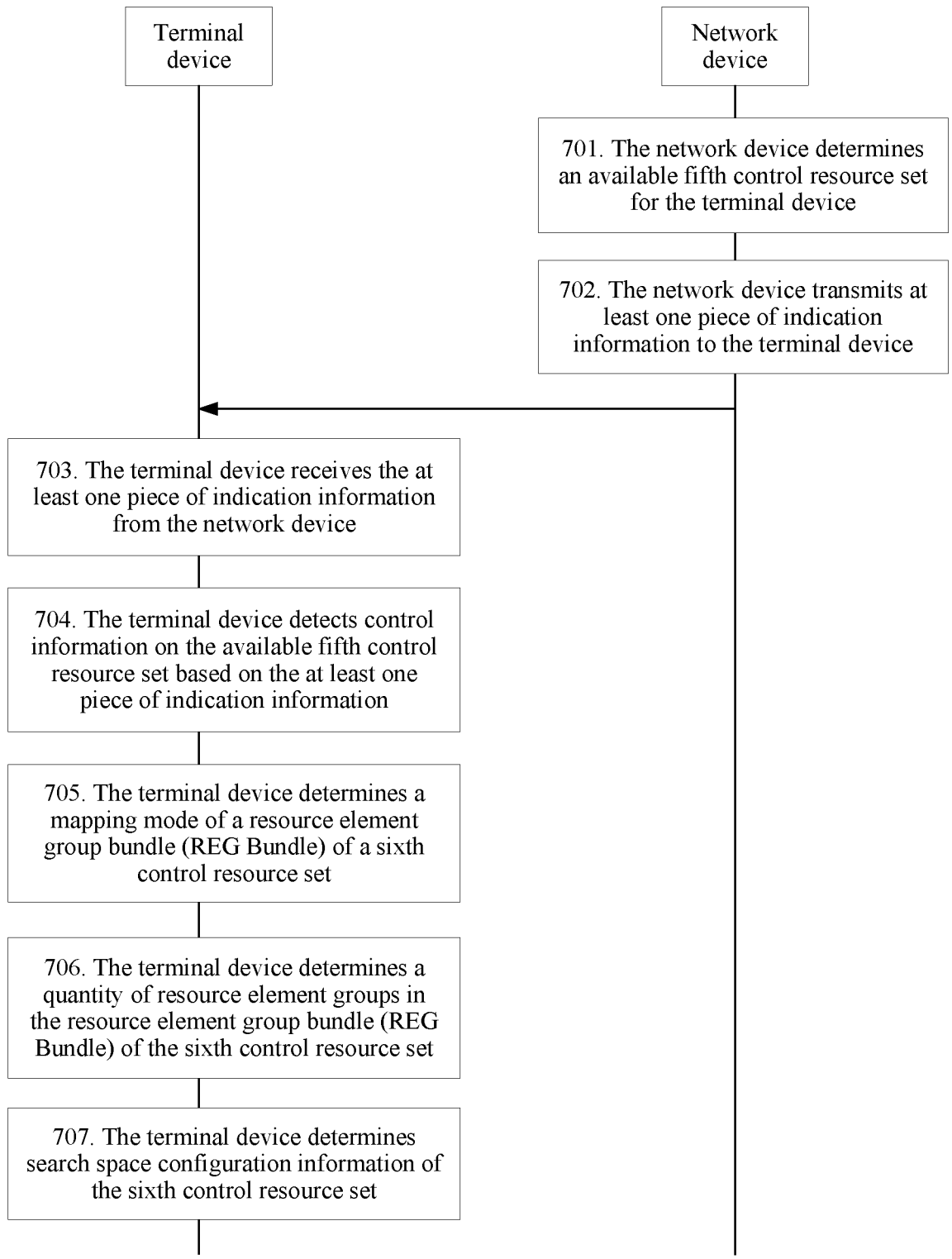
FIG. 7 shows a specific implementation of a method for obtaining a control resource set according to Embodiment 2 of the present invention.

Embodiment 2 of the present invention provides a method for obtaining a control resource set. Based on FIG. 7, the following describes a specific implementation of the method for obtaining a control resource set in Embodiment 2 of the present invention. Herein it should be noted that, scenarios to which Embodiment 2 of the present invention and Embodiment 1 of the present invention are applied are the same, and a difference lies in that a time-frequency position of a control resource set in Embodiment 2 is not affected by a change of a resource position in time domain, where the change makes the resource position unavailable for transmitting control information. Even if a network device determines a first time domain resource position and at least one piece of indication information as described in Embodiment 1 of the present invention, the control information is still transmitted on a first control resource set. A terminal device still receives the control information on the first control resource set according to a notification in advance, an agreement, or a specification. To describe the technical solution in Embodiment 2 of the present invention more clearly, the first control resource set and a second control resource set are hereinafter collectively referred to as a fifth control resource set because the technical solution does not relate to a change of a time domain position of the first control resource set.

Step 701: A network device determines an available fifth control resource set for a terminal device.

Step 702: The network device transmits at least one piece of indication information to the terminal device, where the at least one piece of indication information is used to indicate a first time domain resource position, and the first time domain resource position is unavailable for transmitting control information.

In step 702, the network device determines at least one piece of configuration information, where the at least one piece of configuration information includes the first time domain resource position, the first time domain resource position is unavailable for transmitting the control information, and the at least one piece of indication information is used to indicate the at least one piece of configuration information.

Step 703: The terminal device receives the at least one piece of indication information from the network device.

Step 704: The terminal device receives the control information on the available fifth control resource set based on the at least one piece of indication information.

It should be noted that, for explanations about some technical terms, technical features, and interaction manners (for example, manners of receiving or transmitting configuration information and indication information) in Embodiment 2 of the present invention that are the same as or similar to those in Embodiment 1, reference may be made to the descriptions in Embodiment 1 of the present invention. Details are not described again herein.

According to the method for obtaining a control set that is implemented in the foregoing steps 701 to 704, the network device and the terminal device transmit or receive the control information on the configured fifth control resource set regardless of whether the fifth control resource set includes a time domain resource in the first time domain resource position. If the first time domain resource position is unavailable for transmitting the control information, a time-frequency resource position of the control resource set remains unchanged.

Further, if the fifth control resource set includes the time domain resource in the first time domain resource position, the network device may still change and determine other related configurations and/or parameters than the time-frequency position, or keep them unchanged. The terminal device may determine the other related configurations and/or parameters based on the at least one piece of indication information, where the configurations and/or parameters may be one or more of a type or size of a REG bundle (REG Bundle) of the control resource set, a transmission type of the control resource set, a resource mapping mode of the resource element group bundle, and search space configuration information.

Optionally, before and after the network device transmits (or the terminal device receives) the at least one piece of indication information, the related configurations or parameters remain unchanged.

Optionally, before and after the network device transmits (or the terminal device receives) the at least one piece of indication information, the related configurations and/or parameters change. For the change of the configurations and/or parameters, refer to the descriptions in Embodiment 1 of the present invention. Although no time domain resource of the fifth control resource set changes, the network device and the terminal device may redetermine the configurations and/or parameters based on the time domain resource in the first time domain resource position included in the fifth control resource set, for example, one or more time domain symbols unavailable for transmitting the control information.

In an implementation, as described in a related part (steps 605 to 607) in Embodiment 1 of the present invention, the terminal device may perform corresponding determining according to a preconfigured rule, or perform determining based on the configuration information delivered by the network device. If processing is performed according to the preconfigured rule, the preconfigured rule may be specified in a standard or a protocol, or may be determined by the network device based on different transmission scenarios or transmission requirements, and is already notified or transmitted to the terminal device in advance.

In another implementation, as described in a related part (steps 605 to 607) in Embodiment 1 of the present invention, the configurations and/or parameters are determined by using an example for description or illustration. The wording "previous" is used to identify "before the at least one piece of indication information is transmitted or received", and the fifth control resource set after the at least one indication is transmitted or received is referred to as a sixth control resource set. The names are used for distinguishing only. For understanding of the implementation, refer to the related descriptions in Embodiment 1 of the present invention. The sixth control resource set after the at least one piece of first indication information is transmitted or received may correspond to the second control resource set, and the previous fifth control resource set may correspond to the first control resource set.

In the method in Embodiment 2 of the present invention, after the terminal device receives the at least one piece of indication information, the method further includes at least one of the following steps:

Step 705: The terminal device determines a mapping mode of a resource element group bundle (REG Bundle) of the sixth control resource set, where the mapping mode is frequency-domain-first mapping.

In an optional design, before the terminal device receives the at least one piece of indication information, a mapping mode of a resource element group bundle (REG Bundle) of the fifth control resource set is also frequency-domain-first mapping.

In the optional design, the previous mapping mode of the resource element group bundle of the fifth control resource set remains unchanged.

In another optional design, before the terminal device receives the at least one piece of indication information, a mapping mode of a resource element group bundle (REG Bundle) of the fifth control resource set is time-domain-first mapping.

In the optional design, because the fifth control resource set includes the time domain resource unavailable for transmitting the control information, to improve accuracy of detection by the terminal device and reduce a latency in detecting the control information, the mapping mode of the REG bundle changes to frequency-domain-first mapping.

For example, the mapping mode of the REG bundle of the fifth control resource set is time-domain-first mapping, and a size of the REG bundle is six REGs. For example, the REG bundle occupies first three symbols in a slot in time domain, that is, includes three consecutive REGs in time domain, and includes two consecutive REGs in frequency domain, that is, {3*2}. If the at least one piece of indication information indicates that the third symbol in the slot is unavailable for resource transmission, it is determined that the mapping mode of the REG bundle of the sixth control resource set is frequency-domain-first mapping. To be specific, the REG bundle occupies first two symbols in the slot in time domain, that is, includes two consecutive REGs in time domain, and includes three consecutive REGs in frequency domain, that is, {2*3}. The design may prevent a part of REGs in the REG bundle from occupying the time domain resource unavailable for resource transmission, which otherwise affects accuracy of detection by the terminal device.

Step 706: The terminal device determines a quantity of resource element groups in the resource element group bundle (REG Bundle) of the sixth control resource set.

In an optional design, if determining that a resource size included in the sixth control resource set is less than a first threshold, or that the sixth control resource set cannot support some or all aggregation levels previously supported by the fifth control resource set, the terminal device determines that the quantity of resource element groups in the resource element group bundle (REG Bundle) of the sixth control resource set is less than a quantity of REGs previously in the REG bundle of the fifth control resource set. In this design, if the resource size of the control resource set becomes smaller, the quantity of REGs in the REG bundle is reduced, and settings of the REG bundle are optimized.

Step 707: The terminal device determines search space configuration information of the sixth control resource set, where the search space configuration information includes one or more of a quantity of control channel candidates, an aggregation level, and a downlink control information format.

In an optional design, a search space of the fifth control resource set is a search space configured by the network device for the fifth control resource set before the at least one piece of indication information is received, and the search space configuration information is search space configuration information of the fifth control resource set before the network device transmits the at least one piece of indication information.

In another optional design, the terminal device determines, based on the first time domain resource position, the time domain resource position unavailable for transmitting the control information in the fifth control resource set, obtains the sixth control resource set, and determines the search space configuration information of the sixth control resource set based on the sixth control resource set.

Optionally, if the terminal device determines that the resource size included in the sixth control resource set is less than a second threshold, the terminal device determines that the search space configuration information of the sixth control resource set is the same as the third search space configuration information of the fifth control resource set, or determines that the search space configuration information of the sixth control resource set is fourth search space configuration information, where the fourth search space configuration information is received by the terminal device from the network device or determined according to a preset rule. Herein for explanations about the configuration information and the preset rule, refer to the descriptions about similar wordings above.

Optionally, if the terminal device determines that the resource size included in the sixth control resource set is not less than a second threshold, the terminal device determines that the search space configuration information of the sixth control resource set is the same as the third search space configuration information of the fifth control resource set, or determines that the search space configuration information of the sixth control resource set is fourth search space configuration information, where the fourth search space configuration information is received by the terminal device from the network device or determined according to a preset rule.

It should be noted that, the fifth control resource set used for transmitting the control information is not essentially adjusted to the sixth control resource set. The terminal device can determine the unavailable time domain resource position based on the first time domain resource position, further determine the foregoing configurations and/or parameters based on the sixth control resource set, for example, one or more of the size or type of the REG bundle, the resource mapping mode of the REG bundle, and the search space configuration information, and receive the control information on the sixth control resource set.

The solutions provided in the embodiments of the present invention are described above mainly from a perspective of interaction between network elements. It may be understood that, to implement the foregoing functions, each network element, for example, the network device or the terminal device, may include a corresponding hardware structure and/or software module for performing each function. A person skilled in the art should be easily aware that, in embodiments of the present invention, the units and algorithm steps in the examples described with reference to the embodiments disclosed in this specification can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present invention.

The following provides further explanations based on a possible structure of a terminal device in FIG. 3. The terminal device can perform the methods in Embodiments 1 and 2 of the present invention. The terminal device may include at least a transceiver 301 and a processor 302 (a superior term "processor" is used herein). Optionally, the terminal device may further include a memory in FIG. 3 or the like and other components in the descriptions about FIG. 3. Herein the transceiver 302 may include an independent receiver and transmitter that separately perform corresponding receiving and transmitting functions, or may be a transceiver integrating receiving and transmitting functions. This is not further limited herein. Structurally, the transceiver 301 in FIG. 3 may be split into a receiver 301A and a transmitter 301B. Herein because the terminal device is an optional entity used only as an example for description, the following uses a wireless apparatus as an entity for description. The wireless apparatus may be a unit, a chip, or a component included in the terminal device, or the terminal device itself.

For Embodiment 1 of the present invention: the wireless apparatus includes the processor 302 and the receiver 301A, where the receiver 301A is configured to receive at least one piece of indication information from a network device, where the at least one piece of indication information is used to indicate a first time domain resource position, and the first time domain resource position is unavailable for transmitting control information; the processor 302 is configured to obtain a second control resource set based on the at least one piece of indication information; and the receiver 301A is further configured to receive the control information on the second control resource set.

Optionally, the wireless apparatus may further include the transmitter 301B.

Optionally, the second control resource set does not include a time domain resource in the first time domain resource position.

Optionally, before the receiver receives the at least one piece of indication information from the network device, the processor obtains a configured available control resource set, where the available control resource set includes a first control resource set, the first control resource set is used to transmit the control information, and a part or an entirety of the first control resource set occupies the first time domain resource position.

Optionally, the processor obtains the second control resource set based on the first time domain resource position and the first control resource set.

Optionally, the at least one piece of indication information is further used to indicate a third control resource set; and the obtaining, by the processor, a second control resource set based on the at least one piece of indication information includes at least one of the following: using the third control resource set indicated by the at least one piece of indication information, as the second control resource set; when the available control resource set configured for the terminal device includes only the first control resource set, using the third control resource set indicated by the at least one piece of indication information, as the second control resource set; when the available control resource set configured for the terminal device includes only the first control resource set, and the entirety of the first control resource set occupies the first time domain resource position, using the third control resource set indicated by the at least one piece of indication information, as the second control resource set; and when the available control resource set configured for the terminal device includes the first control resource set, and the part of the first control resource set occupies the first time domain resource position, obtaining, by the processor, the second control resource set based on the first time domain resource position and the first control resource set.

Further optionally, the at least one piece of indication information includes at least one piece of first indication information used to indicate the third control resource set and at least one piece of second indication information used to indicate the first time domain resource position; and the receiver receives the at least one piece of first indication information before receiving the at least one piece of second indication information, and before the at least one piece of second indication information is received, the third control resource set is a candidate control resource set that is not used to receive the control information; or the receiver receives the at least one piece of first indication information and the at least one piece of second indication information simultaneously, where the at least one piece of indication information is carried in a same broadcast message, or the at least one piece of first indication information and the at least one piece of second indication information are carried in messages or information of different types.

For Embodiment 2 of the present invention: the wireless apparatus includes the processor 302 and the receiver 301A, where the receiver is configured to receive at least one piece of indication information from a network device, where the at least one piece of indication information is used to indicate a first time domain resource position, and the first time domain resource position is unavailable for transmitting control information; the processor is configured to determine a fifth control resource set, where the fifth control resource set is configured by the network device for the terminal device; and the receiver is configured to receive the control information on the fifth control resource set.

Optionally, the processor is configured to determine, based on the at least one piece of indication information, to receive the control information on the fifth control resource set.

It should be noted that, for specific implementations of the methods performed by the wireless apparatus for obtaining a control resource set, reference may be made to the descriptions about the methods for obtaining a control resource according to Embodiment 1 and Embodiment 2 of the present invention. The terminal devices in Embodiment 1 and Embodiment 2 of the present invention are respectively based on a same idea as the methods for obtaining a control resource that correspond to FIG. 6 and FIG. 7. The terminal devices bring the same technical effects as the methods for obtain a control resource. Specific functions of the processor and the receiver included in the wireless apparatus, and any feature, term, and implementation detail thereof in Embodiment 1 and Embodiment 2 of the present invention respectively correspond to functions of the terminal devices in the method embodiments corresponding to FIG. 6 and FIG. 7. For specific content, respectively refer to the descriptions in the method embodiments corresponding to FIG. 6 and FIG. 7. Details are not described again herein.

It should be noted that, in the foregoing embodiment, an entirety or a part of the wireless apparatus may be implemented by software, hardware, firmware, or any combination thereof.

Figure 8:
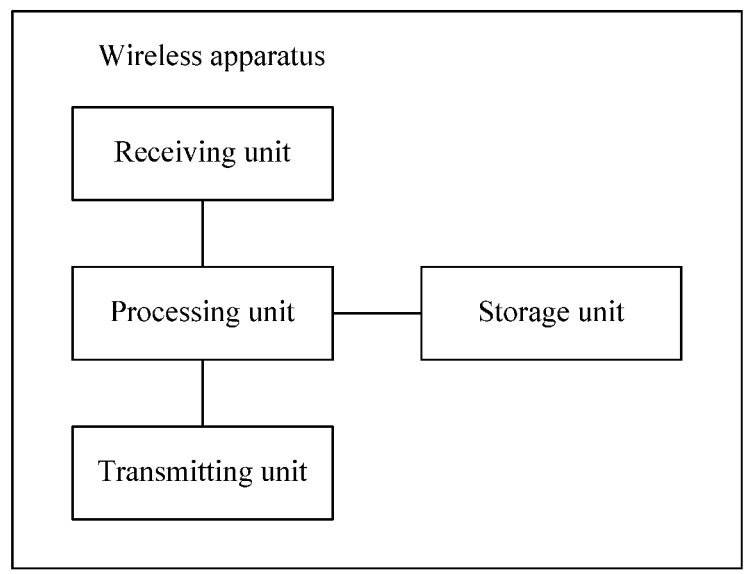
FIG. 8 is a possible schematic structural diagram of a wireless apparatus according to an embodiment of the present invention.

For the structure of the wireless apparatus, another optional manner is: a corresponding component in the foregoing embodiment may be implemented by corresponding hardware, or may be implemented by corresponding software executed by corresponding hardware. For example, the receiver 301A may be hardware that can perform the receiving function, for example, a transceiver integrating the transmitting and receiving functions or a receiver implementing only the receiving function, or may be a general processor or any other hardware device that can execute a corresponding computer program to implement the foregoing function, or may be a software module or a functional unit performing a corresponding function, for example, a receiving unit. For another example, the processor 302 may be hardware that can perform the function of the processor, for example, a processor having a specific function, or a general processor, or may be any other hardware device that can execute a corresponding computer program to implement the foregoing function, or may be a software module or a functional unit performing a corresponding function, for example, a processing unit. For another example, the transmitter 301B may be hardware that can perform the transmitting function, for example, a transceiver integrating the transmitting and receiving functions or a transmitter implementing only the transmitting function, or may be a general processor or any other hardware device that can execute a corresponding computer program to implement the foregoing function, or may be a software module or a functional unit performing a corresponding function, for example, a transmitting unit. Optionally, the wireless apparatus may further include a storage unit. For details, refer to FIG. 8.

The following provides further explanations based on a possible structure of a network device in FIG. 2. The network device can perform the methods in Embodiment 1 and Embodiment 2 of the present invention. The network device may include at least a controller or processor 201 (the processor 201 is used as an example for description below) and a transceiver 202. Optionally, the terminal device may further include a memory in FIG. 2 or the like and other components in the descriptions about FIG. 2. Herein the transceiver 202 may include an independent receiver and transmitter that separately perform corresponding receiving and transmitting functions, or may be a transceiver integrating receiving and transmitting functions. This is not further limited herein. Structurally, the transceiver 202 in FIG. 2 may be split into a receiver 202A and a transmitter 202B. Herein because the network device is an optional entity used only as an example for description, the following uses a wireless apparatus as an entity for description. The wireless apparatus may be a unit, a chip, or a component included in the network device, or the network device itself.

For Embodiment 1 of the present invention: the wireless apparatus includes the processor 201 and the transmitter 202B, where the processor 201 determines at least one piece of configuration information, where the at least one piece of configuration information includes a first time domain resource position, and the first time domain resource position is unavailable for transmitting control information; the transmitter 202B transmits at least one piece of indication information to a terminal device, where the at least one piece of indication information is used to indicate the at least one piece of configuration information; the processor obtains a second control resource set based on the at least one piece of configuration information; and the transmitter transmits the control information on the second control resource set.

Optionally, the second control resource set does not include a time domain resource in the first time domain resource position.

Optionally, before the transmitter transmits the at least one piece of indication information to the terminal device, the processor configures an available control resource set for the terminal device, where the available control resource set includes a first control resource set, the first control resource set is used to transmit the control information, and a part or an entirety of the first control resource set occupies the first time domain resource position.

Optionally, the processor obtains the second control resource set based on the first time domain resource position and the first control resource set.

Optionally, the at least one piece of configuration information further includes a third control resource set; and that the processor obtains a second control resource set based on the at least one piece of configuration information includes at least one of the following: the processor uses the third control resource set as the second control resource set;

when the available control resource set configured by the processor for the terminal device includes only the first control resource set, the processor uses the third control resource set as the second control resource set; when the available control resource set configured by the processor for the terminal device includes only the first control resource set, and the entirety of the first control resource set occupies the first time domain resource position, the processor uses the third control resource set as the second control resource set; and when the available control resource set configured by the processor for the terminal device includes the first control resource set, and the part of the first control resource set occupies the first time domain resource position, the processor obtains the second control resource set based on the first time domain resource position and the first control resource set.

Further optionally, the at least one piece of indication information includes at least one piece of first indication information used to indicate the third control resource set and at least one piece of second indication information used to indicate the first time domain resource position; and the transmitter transmits the at least one piece of first indication information before transmitting the at least one piece of second indication information, and before the at least one piece of second indication information is transmitted, the third control resource set is a candidate control resource set that is not used to transmit the control information; or the transmitter transmits the at least one piece of first indication information and the at least one piece of second indication information simultaneously, where the at least one piece of indication information is carried in a same broadcast message, or the at least one piece of first indication information and the at least one piece of second indication information are carried in messages or information of different types.

For Embodiment 2 of the present invention: the wireless apparatus includes the processor 201 and the transmitter 202B, where the processor 201 determines at least one piece of configuration information, where the at least one piece of configuration information includes a first time domain resource position, and the first time domain resource position is unavailable for transmitting control information; the transmitter 202B transmits at least one piece of indication information to a terminal device, where the at least one piece of indication information is used to indicate the at least one piece of configuration information; and the transmitter transmits the control information on a fifth control resource set.

Optionally, the processor determines to transmit the control information on the fifth control resource set.

The network device determines the at least one piece of configuration information, where the at least one piece of configuration information includes the first time domain resource position, and the first time domain resource position is unavailable for transmitting the control information; the network device transmits the at least one piece of indication information to the terminal device, where the at least one piece of indication information is used to indicate the at least one piece of configuration information; the network device obtains a second control resource set based on the at least one piece of configuration information; and the network device transmits the control information on the second control resource set. It should be noted that, for specific implementations of the methods performed by the wireless apparatus for obtaining a control resource set, reference may be made to the descriptions about the methods for obtaining a control resource according to Embodiment 1 and Embodiment 2 of the present invention. The network devices in Embodiment 1 and Embodiment 2 of the present invention are respectively based on a same idea as the methods for obtaining a control resource that correspond to FIG. 6 and FIG. 7. The network devices bring the same technical effects as the methods for obtain a control resource. Specific functions of the processor and the receiver included in the wireless apparatus, and any feature, term, and implementation detail thereof in Embodiment 1 and Embodiment 2 of the present invention respectively correspond to functions of the network devices in the method embodiments corresponding to FIG. 6 and FIG. 7. For specific content, refer to the descriptions in the method embodiments corresponding to FIG. 6 and FIG. 7. Details are not described again herein.

It should be noted that, in the foregoing embodiment, an entirety or a part of the wireless apparatus may be implemented by software, hardware, firmware, or any combination thereof.

For the structure of the wireless apparatus, another optional manner is: a corresponding component in the foregoing embodiment may be implemented by corresponding hardware, or may be implemented by corresponding software executed by corresponding hardware. For example, the transmitter 202B may be hardware that can perform the transmitting function, for example, a transceiver integrating the transmitting and receiving functions or a transmitter implementing only the receiving function, or may be a general processor or any other hardware device that can execute a corresponding computer program to implement the foregoing function, or may be a software module or a functional unit performing a corresponding function, for example, a transmitting unit. For another example, the processor 201 may be hardware that can perform the function of the processor, for example, a processor having a specific function, or a general processor, or may be any other hardware device that can execute a corresponding computer program to implement the foregoing function, or may be a software module or a functional unit performing a corresponding function, for example, a processing unit. For another example, the receiver 202A may be hardware that can perform the receiving function, for example, a transceiver integrating the transmitting and receiving functions or a receiver implementing only the receiving function, or may be a general processor or any other hardware device that can execute a corresponding computer program to implement the foregoing function, or may be a software module or a functional unit performing a corresponding function, for example, a receiving unit. Optionally, the wireless apparatus may further include a storage unit. For details, refer to FIG. 8.

For the foregoing wireless apparatus (including the wireless apparatus corresponding to the terminal device and the wireless apparatus corresponding to the network device), in still another optional manner, when the wireless apparatus is implemented by using software, the wireless apparatus may be implemented completely or partially in a form of a computer program product. The computer program product includes one or more computer instructions. When the computer program instructions are loaded and executed on a computer, the procedure or functions according to the embodiments of this application are all or partially implemented. The computer may be a general-purpose computer, a special-purpose computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk (SSD)), or the like.

It should be noted that, the processor included in the network device and the wireless apparatus configured to perform the method for obtaining a control resource set according to the embodiments of the present invention may be a central processing unit (CPU), a general purpose processor, a digital signal processor (DSP), an application-specific integrated circuit (ASIC), a field programmable gate array (FPGA) or another programmable logic device, a transistor logic device, a hardware component, or any combination thereof. The processor may implement or execute various example logical blocks, modules, and circuits described with reference to content disclosed in embodiments of the present invention. Alternatively, the processor may be a combination implementing a computing function, for example, a combination including one or more microprocessors, or a combination of a DSP and a microprocessor.

Method or algorithm steps described with reference to the embodiments of the present invention may be implemented by hardware, or may be implemented by a processor by executing a software instruction. The software instruction may include a corresponding software module. The software module may be located in a RAM, a flash memory, a ROM, an EPROM, an EEPROM, a register, a hard disk, a removable hard disk, a CD-ROM, or a storage medium of any other form known in the art. For example, a storage medium is coupled to a processor, so that the processor can read information from the storage medium or write information into the storage medium. Certainly, the storage medium may be a component of the processor. The processor and the storage medium may be located in the ASIC. In addition, the ASIC may be located in a terminal device. Certainly, the processor and the storage medium may exist in the terminal device as discrete components.

It may be understood that the accompanying drawing shows only a simplified design of the wireless apparatus. In an actual application, the wireless apparatus may include any quantities of transmitters, receivers, processors, controllers, memories, communications units, and the like.

An embodiment of the present invention further provides a communications system. The communications system includes aforementioned at least one network device and at least one terminal device for performing Embodiment 1 of the present invention, or includes aforementioned at least one network device and at least one terminal device for performing Embodiment 2 of the present invention.

It should be understood that "an embodiment", "one embodiment", or "an embodiment of the present invention" mentioned in the entire specification means that particular features, structures, or characteristics related to the embodiment are included in at least one embodiment of the present invention. Therefore, "in an embodiment", "in one embodiment", or "in an embodiment of the present invention" appearing throughout this specification does not necessarily refer to a same embodiment. In addition, these particular features, structures, or characteristics may be combined in one or more embodiments in any appropriate manner.

The objectives, technical solutions, and beneficial effects of the present invention are further described in detail in the foregoing specific embodiments. It should be understood that the foregoing descriptions are merely specific embodiments of the present invention, but are not intended to limit the protection scope of the present invention. Any modification, equivalent replacement, improvement, or the like based on the technical solutions of the present invention shall fall within the protection scope of the present invention.

What is claimed is:

1. A method comprising:
receiving, by a terminal device, indication information from a network device, wherein the indication information indicates a first time domain resource position, and the first time domain resource position is unavailable for transmitting control information;
obtaining, by the terminal device, a second control resource set according to the indication information; and
receiving, by the terminal device, the control information on the second control resource set;
wherein the indication information further indicates a time domain resource position of a demodulation reference signal or a slot format for transmitting the control information.

2. The method according to claim 1, wherein the second control resource set does not comprise a time domain resource in the first time domain resource position.

3. The method according to claim 1, wherein before receiving, by the terminal device, the indication information from the network device, the method further comprises:
obtaining, by the terminal device, a configured available control resource set, wherein the configured available control resource set comprises a first control resource set, the first control resource set is used to transmit the control information, and at least part of the first control resource set occupies the first time domain resource position.

4. The method according to claim 3, wherein obtaining, by the terminal device, the second control resource set according to the indication information comprises:
obtaining, by the terminal device, the second control resource set according to the first time domain resource position and the first control resource set.

5. The method according to claim 4, wherein obtaining, by the terminal device, the second control resource set according to the first time domain resource position and the first control resource set comprises:
the second control resource set is a part of the first control resource set that does not occupy the first time domain resource position; or
a start position of the second control resource set on a time domain resource is advanced by a first duration from the first control resource set.

6. The method according to claim 3, wherein the indication information further indicates a third control resource set; and obtaining, by the terminal device, the second control resource set according to the indication information comprises:
using, by the terminal device, the third control resource set as the second control resource set.

7. The method according to claim 3, wherein the indication information further indicates a third control resource set; and obtaining, by the terminal device, the second control resource set according to the indication information comprises:
when the configured available control resource set comprises only the first control resource set and an entirety of the first control resource set occupies the first time domain resource position, using the third control resource set as the second control resource set; and
when the configured available control resource set and part of the first control resource set occupies the first time domain resource position, obtaining, by the terminal device, the second control resource set according to the first time domain resource position and the first control resource set.

8. The method according to claim 7, wherein:
the indication information comprises first indication information indicating the third control resource set and second indication information indicating the first time domain resource position; and wherein:
the terminal device receives the first indication information before receiving the second indication information, and before the second indication information is received, the third control resource set is a candidate control resource set that is not used to receive the control information; or
the terminal device receives the first indication information and the second indication information simultaneously, wherein the indication information is carried in a same broadcast message or the first indication information and the second indication information are carried in messages or information of different types.

9. The method according to claim 3, wherein the configured available control resource set further comprises a fourth control resource set, the fourth control resource set is used to transmit the control information, and the fourth control resource set does not occupy the first time domain resource position; and
the second control resource set is the fourth control resource set.

10. The method according to claim 3, wherein the configured available control resource set further comprises a fourth control resource set, the fourth control resource set is used to transmit the control information, and the fourth control resource set does not occupy the first time domain resource position; and receiving, by the terminal device, the control information on the second control resource set comprises:
receiving, by the terminal device, the control information on the second control resource set and the fourth control resource set.

11. The method according to claim 3, wherein the method further comprises:
determining, by the terminal device, a mapping mode of a resource element group bundle (REG Bundle) of the second control resource set, wherein the mapping mode is frequency-domain-first mapping or time-domain-first mapping.

12. The method according to claim 11, wherein
determining, by the terminal device, a mapping mode of the resource element group bundle (REG Bundle) of the second control resource set comprises:
when a quantity of symbols of time domain resources in the first control resource set is greater than or equal to a quantity of symbols of time domain resources in the second control resource set, and the quantity of symbols of time domain resources in the second control resource set is not equal to 1, determining, by the terminal device, that the mapping mode of the REG Bundle of the second control resource set is the same as a mapping mode of a resource element group bundle of the first control resource set; or
when a quantity of symbols of time domain resources in the second control resource set is equal to 1, determining, by the terminal device, that the mapping mode of the REG Bundle of the second control resource set is frequency-domain-first mapping.

13. The method according to claim 11, wherein the method further comprises:
determining, by the terminal device, a quantity of resource element groups (REGs) in the REG Bundle of the second control resource set.

14. The method according to claim 13, wherein determining, by the terminal device, the quantity of resource element groups in the REG Bundle of the second control resource set comprises:
when a resource size comprised in the second control resource set is less than a first threshold or the second control resource set cannot support aggregation levels supported by the first control resource set, determining, by the terminal device, that the quantity of REGs in the REG Bundle of the second control resource set is less than a quantity of REGs in the REG bundle of the first control resource set; or
determining, by the terminal device, the quantity of REGs in the REG Bundle of the second control resource set according to first configuration information, wherein the first configuration information is received by the terminal device from the network device or determined according to a preset rule.

15. The method according to claim 3, further comprising:
determining, by the terminal device, search space configuration information of the second control resource set, wherein the search space configuration information comprises a quantity of control channel candidates, an aggregation level, or a downlink control information format.

16. The method according to claim 15, wherein:
determining, by the terminal device, the search space configuration information of the second control resource set comprises:
determining, by the terminal device, the search space configuration information of the second control resource set according to a resource size of the second control resource set and search space configuration information of the first control resource set; or
determining, by the terminal device, the search space configuration information of the second control resource set according to second configuration information, wherein the second configuration information is received by the terminal device from the network device or determined according to a preset rule.

17. The method according to claim 16, wherein determining, by the terminal device, the search space configuration information of the second control resource set according to the resource size of the second control resource set and the search space configuration information of the first control resource set comprises:
when the terminal device determines that the resource size of the second control resource set is less than a second threshold, determining that the search space configuration information of the second control resource set is the same as the search space configuration information of the first control resource set, or determining that the search space configuration information of the second control resource set is second search space configuration information, wherein the second search space configuration information is received by the terminal device from the network device or determined according to a preset rule; or
when the terminal device determines that the resource size of the second control resource set is not less than a second threshold, determining that the search space configuration information of the second control resource set is the same as the search space configuration information of the first control resource set, or determining that the search space configuration information of the second control resource set is second search space configuration information, wherein the second search space configuration information is received by the terminal device from the network device or determined according to a preset rule.

18. A apparatus, comprising a processor and a receiver, wherein:
the receiver is configured to receive indication information from a network device, wherein the indication information indicates a first time domain resource position, and the first time domain resource position is unavailable for transmitting control information;
the processor is configured to obtain a second control resource set according to the indication information; and
the receiver is further configured to receive the control information on the second control resource set;
wherein the indication information further indicates a time domain resource position of a demodulation reference signal or a slot format for transmitting the control information.

19. The apparatus according to claim 18, wherein
the second control resource set does not comprise a time domain resource in the first time domain resource position.

* * * * *